US009529657B2

(12) United States Patent
Jan et al.

(10) Patent No.: US 9,529,657 B2
(45) Date of Patent: Dec. 27, 2016

(54) TECHNIQUES FOR GENERATING DIAGNOSTIC IDENTIFIERS TO TRACE EVENTS AND IDENTIFYING RELATED DIAGNOSTIC INFORMATION

(71) Applicant: Oracle International Corporation, Redwood Shores, CA (US)

(72) Inventors: Wai Jan, Portland, OR (US); Gregory Cook, Leicestershire (GB); R. Bruce Irvin, Portland, OR (US); Kaj van de Loo, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 132 days.

(21) Appl. No.: 14/490,619

(22) Filed: Sep. 18, 2014

(65) Prior Publication Data
US 2015/0227405 A1 Aug. 13, 2015

Related U.S. Application Data

(60) Provisional application No. 61/984,690, filed on Apr. 25, 2014, provisional application No. 61/937,316, filed on Feb. 7, 2014.

(51) Int. Cl.
*G06F 11/07* (2006.01)
(52) U.S. Cl.
CPC ........ *G06F 11/079* (2013.01); *G06F 11/0778* (2013.01)
(58) Field of Classification Search
CPC ... G06F 11/0778; G06F 11/079; G06F 11/366; G06F 11/0709
See application file for complete search history.

(56) References Cited

U.S. PATENT DOCUMENTS 6,751,671 B1   6/2004 Urien
6,970,935 B1  11/2005 Maes
(Continued)

FOREIGN PATENT DOCUMENTS

CA   1271827   7/1990
EP   1569112   8/2005
(Continued)

OTHER PUBLICATIONS

Booking and Paying for Your Holiday—Holidays FAQs, et2holidays.com, Copyright Jet2holidays.com, 2002-2014, a subsidiary of Dart Group PLC, Retrieved from the Internet: <URL: http://www.jet2holidays.com/faqs-essential-info2.aspx>, 2002-2014, 2 pages.

(Continued)

*Primary Examiner* — Nadeem Iqbal
(74) *Attorney, Agent, or Firm* — Kilpatrick Townsend & Stockton LLP

(57) ABSTRACT

Techniques are described for determining diagnostic information (e.g., a diagnostic identifier) for one or more events related to operations performed in a cloud computer system. A diagnostic identifier may be generated based on diagnostic data corresponding to one or more attributes about an event. A computing operation may be performed to generate a code (e.g., a hash code) for each attribute in the diagnostic data. The generated code(s) may be combined to form a diagnostic identifier to identify the diagnostic data. A comparison may be performed by comparing each code in one diagnostic identifier to a code in another diagnostic identifier corresponding to an attribute for which the codes were generated. A measure of a match between the two identifiers may be determined using a result of the comparison. The measure of the match may enable tracing and analysis of one or more events occurring in the cloud computer system.

20 Claims, 8 Drawing Sheets

(56) References Cited

U.S. PATENT DOCUMENTS

| | | | |
|---|---|---|---|
| 7,117,366 | B2 | 10/2006 | Vincent et al. |
| 7,430,290 | B2 | 9/2008 | Zhu |
| 7,894,253 | B2 | 2/2011 | Kreupl et al. |
| 7,984,334 | B2* | 7/2011 | Champlin .............. G06F 11/366 714/38.11 |
| 8,000,377 | B2 | 8/2011 | Blanchard et al. |
| 8,504,837 | B2 | 8/2013 | Jasper et al. |
| 8,959,063 | B2 | 2/2015 | Haeberle et al. |
| 9,043,600 | B2 | 5/2015 | Jasper et al. |
| 9,274,919 | B2* | 3/2016 | Greifeneder ........ G06F 9/45504 |
| 2003/0187631 | A1 | 10/2003 | Masushige et al. |
| 2004/0107196 | A1 | 6/2004 | Chen et al. |
| 2004/0162823 | A1 | 8/2004 | van de Loo et al. |
| 2005/0259723 | A1 | 11/2005 | Blanchard et al. |
| 2006/0112127 | A1 | 5/2006 | Krause |
| 2006/0206348 | A1 | 9/2006 | Chen et al. |
| 2008/0010676 | A1 | 1/2008 | Dosa Racz et al. |
| 2008/0027755 | A1* | 1/2008 | Portnoy ................ G06F 19/326 705/2 |
| 2009/0158302 | A1 | 6/2009 | Nicodemus et al. |
| 2009/0170557 | A1 | 7/2009 | Chauhan et al. |
| 2010/0064179 | A1* | 3/2010 | Champlin .............. G06F 11/366 714/38.1 |
| 2010/0290347 | A1 | 11/2010 | Jiang et al. |
| 2011/0307547 | A1 | 12/2011 | Backer et al. |
| 2012/0109902 | A1 | 5/2012 | Rozensztejn et al. |
| 2012/0155470 | A1 | 6/2012 | McNamee et al. |
| 2012/0158872 | A1 | 6/2012 | McNamee et al. |
| 2012/0158993 | A1 | 6/2012 | McNamee et al. |
| 2012/0158994 | A1 | 6/2012 | McNamee et al. |
| 2012/0158995 | A1 | 6/2012 | McNamee et al. |
| 2012/0176968 | A1 | 7/2012 | Luna |
| 2012/0179825 | A1 | 7/2012 | Dhoolia et al. |
| 2013/0055256 | A1 | 2/2013 | Banga et al. |
| 2013/0086210 | A1 | 4/2013 | Yiu et al. |
| 2013/0086211 | A1 | 4/2013 | Sondhi et al. |
| 2013/0110778 | A1 | 5/2013 | Taylor et al. |
| 2013/0174154 | A1 | 7/2013 | Poore et al. |
| 2013/0219176 | A1 | 8/2013 | Akella et al. |
| 2013/0275492 | A1 | 10/2013 | Kaufman et al. |
| 2014/0025832 | A1 | 1/2014 | Ito |
| 2014/0081925 | A1 | 3/2014 | Haeberle et al. |
| 2014/0181864 | A1 | 6/2014 | Marshall et al. |
| 2015/0082385 | A1 | 3/2015 | Maria |
| 2015/0130365 | A1 | 5/2015 | Kim et al. |
| 2015/0227406 | A1* | 8/2015 | Jan ....................... G06F 11/079 714/37 |
| 2015/0229638 | A1 | 8/2015 | Loo |
| 2015/0229645 | A1 | 8/2015 | Keith et al. |
| 2015/0278245 | A1 | 10/2015 | Sagar et al. |

FOREIGN PATENT DOCUMENTS

| | | |
|---|---|---|
| EP | 2849061 | 3/2015 |
| WO | 2013071087 | 5/2013 |
| WO | 2013086211 | 6/2013 |
| WO | 2013126570 | 8/2013 |
| WO | 2015038225 | 3/2015 |
| WO | 2015042547 | 3/2015 |
| WO | 2015050568 | 4/2015 |
| WO | 2015119529 | 8/2015 |
| WO | 2015119658 | 8/2015 |
| WO | 2015119659 | 8/2015 |

OTHER PUBLICATIONS

Disney FastPass+, All Ears.Net, R.Y.I. Copyright Enterprises, LLC, Retrieved from the Internet: <URL: http://allears.net/tp/fastpass-plus.htm>, 1999-2014, 4 pages.

Dispersed Virtual Queue Management, tensabarrieronline.com, Tensabarrieronline—Tamis Corporation, Retrieved from the Internet: <URL: http://www.tensabarrieronline.com/shop/dispersed-virtual-queue-management!>, Copyright 2014, 2 pages.

Electronic Queuing—QtracVR Virtual Queuing System, lavi.com, Lavi Industries, Retrieved from the Internet: <URL: http://www.lavi.com/electronic-queuing/virtual-queuing.aspx>, Copyright 2014, 2 pages.

Electronic Ticket System—Queue Management without Lines, queuesolutions.com, Copyright 2013 Queue Solutions, Inc., Retrieved from the Internet: <URL: http://queuesolutions.com/electronic-ticketsystem.php>, 2012, 2 pages.

eQTM Virtual Queuing, tensator.com, Copyright Tensator, Retrieved from the Internet: <URL: http://www.tensator.com/us/showroom/eq-virtual-queuing.aspx>, 1 page.

NEMO-Q Virtual Queuing, NEMO-Q.com, retrieved from the Internet: <URL: http://www.nemoq.com/virtual_queuing_systems.html>, Copyright 2014, 3 pages.

Queuing at busy check-in counters is now a thing of the past, thanks to our online "self check-in" system, airnamibia.com, Air Namibia, Retrieved from the Internet: <URL: http://www.airnamibia.com/planbook/check-in-online/>, 2 pages.

VirtuaQ: Virtual Queue Management System, esco.com.sg, Copyright 2012, Esco Pte. Ltd., <URL: http://www.esco.com.sg/development-and-mobility/virtuaq/>, 2012, 3 pages.

Web Check-in—Bangkok Airways, bangkokair.com, Bangkok Airways, Retrieved from the Internet: <URL: http://www.bangkokair.com/pp./view/web-check-in>, 2 pages.

Chanliau, Oracle Enterprise Gateway:Securing SOA and Web Services with Oracle Enterprise Gateway, retrieved from the Internet: URL:http://www.oracle.comjtechnetwork/middleware/id-mgmtjoeg-tech-wp-apr-2011-345875.pdf, Apr. 30, 2011, 22 pages.

Facemire et al., Cloud Mobile Development: Enabled by Back-End-as-a-Service, Mobile's New Middleware, Aug. 30, 2012, 15 pages.

Keating, Cloud-based setup reduces wait-times at government offices (with related video), American City & County, Retrieved from the Internet: <URL: http://americancityandcounty.com/telecommunications/cloud-based-setup-reduces-wait-timesgovernment-offices-related-video>, May 5, 2014, 4 pages.

Lawson, House of Fraser trials virtual queue system for online collection, Retail Week [online]. EMAP Publishing Limited, Retrieved from the Internet: <URL: http://www.retailweek.com/companies/house-of-fraser/house-of-fraser-trials-virtual-queue-systemfor-online-collection/5052769.article>, Sep. 6, 2013, 3 pages.

Ponge, Fork and Join: Java can excel at painless parallel programming too!. Oracle Technology Network, (retrieved on Sep. 15, 2014], retrieved from the internet: <URL: http://www.oracle.com/technetwork/articles/javaffork-join-422606.html>, Jul. 2011, 7 pages.

Ponge, Scenarios for using Oracle Nashorn as a command-line tool and as an embedded interpreter in Java applications, Oracle Technology Network [online], (retrieved on Sep. 15, 2014], retrieved from the internet: <URL: http://www.oracle.com/technetwork/articles/java/jf14-nashorn-2126515.html>, 8 pages.

Woods, Oracle Unveils Project Avatar at JavaOne, InfoQ.com, Sep. 27, 2013, [online], [retrieved on Sep. 15, 2014], retrieved from the internet :<URL: http://www.infoq.com/news/2013/09/oracle-unveils-avatar>, Sep. 27, 2013, 9 pages.

International Application No. PCT/RU2014/000677, International Search Report and Written Opinion mailed on Feb. 19, 2015, 13 pages.

International Application No. PCT/US2014/044165, International Search Report and Written Opinion mailed on Nov. 11, 2014, 9 pages.

International Application No. PCT/US2014/053747, International Search Report and Written Opinion mailed on Nov. 25, 2014, 17 pages.

International Application No. PCT/US2014/056154, International Search Report and Written Opinion mailed on Dec. 5, 2014, 12 pages.

U.S. Appl. No. 14/475,285, Notice of Allowance mailed on Aug. 24, 2015, 17 pages.

U.S. Appl. No. 14/490,621, Non-Final Office Action, Apr. 14, 2016, 5 pages.

\* cited by examiner

TECHNIQUES FOR GENERATING DIAGNOSTIC IDENTIFIERS TO TRACE EVENTS AND IDENTIFYING RELATED DIAGNOSTIC INFORMATION

CROSS-REFERENCES TO RELATED APPLICATIONS

The present application claims priority and benefit from the following patent applications: (1) U.S. Provisional Application No. 61/984,690, filed Apr. 25, 2014, entitled "COMPUTER DEBUGGING USING HASH FUNCTIONS TO GENERATE STACK TRACE IDENTIFIERS;" and (2) U.S. Provisional Application No. 61/937,316, filed Feb. 7, 2014, entitled "MOBILE CLOUD SERVICE (MCS)." The entire contents of the above-identified provisional patent applications are incorporated herein by reference for all purposes.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to the field of diagnostic computing and more generally to techniques for determining diagnostic information about a computing environment.

BACKGROUND

Tracing errors in computer programs can be a difficult, time-consuming process. Debugging tools assist developers in finding errors and tracing program flow by stopping a program when an exception (i.e., an error) is encountered at run time.

When multiple applications, running on different computing environments, interface with one another, tracking down the cause of errors may not be so straightforward. In such environments, a single debugging tool may not be adequate and compatible with different computing environments. An output from a first application may cause an exception in a second application. The second application throws the exception and ideally, preserves trace data; however, the first application simply keeps running. Stack trace data might be preserved for the first application if it is known that an error was thrown in the second application. In such instances, the stack trace data for each application may be examined to identify an error and determine a relationship between a comparison of the stack trace data for each application.

Sometimes, a developer of (or team who developed) the first application is not the same as the developer of (or team who developed) the second application. As such, each party responsible for develop of an application may not be aware of the implementation of a different application developed by a different party. Therefore, analysis of one application that calls another application may provide challenges to understand an error.

The problem is exacerbated not only when there are different computers executing different applications that interface with one another, but also when those computers are running in a cloud computing environment. That the hardware is disembodied from the developers adds yet another thing that can go wrong in troubleshooting. If more than a few computers or applications are involved, then the process of preserving all of the stack traces and analyzing them can become cumbersome. There is a need in the art for techniques to enable a person to obtain a better understanding of diagnostic data.

BRIEF SUMMARY

Techniques are described for determining diagnostic information about a computing environment. In particular, diagnostic information, e.g., a diagnostic identifier, may be generated for one or more events occurring in a cloud computer system. An event may correspond to processing performed by the cloud computer system to facilitate communication of a request, from a computing device (e.g., a mobile phone), for a service provided by one or more enterprise computer systems. The generated diagnostic information can be used to understand or trace one or more events occurring in the cloud computer system.

In some embodiments, a diagnostic identifier may be generated based on diagnostic data corresponding to an event. The diagnostic data (e.g., stack trace data) may include information corresponding to one or more attributes about the event. A computing operation (e.g., a hash operation) may be performed to generate a code (e.g., a hash code) for each attribute in the diagnostic data. In some embodiments, a code may be generated based on diagnostic data corresponding to multiple attributes about the event. The generated code(s) may be combined to form a diagnostic identifier to identify the diagnostic data for the event.

In some embodiments, a comparison can be performed between two diagnostic identifiers, each of which corresponds to a different event occurring in a cloud computer system. A comparison may be performed by comparing each code in one diagnostic identifier to a code in another diagnostic identifier corresponding to an attribute for which the codes were generated. A measure of a match between the two identifiers may be determined using a result of the comparison. A measure of a match can indicate a ratio of matching codes or the amount of codes that match. Based on the codes that match, one can determine whether an event corresponding to each identifier are related and if so, based on the attributes corresponding to the codes that match. A result of a comparison between two identifiers based on their respective codes may result in an indication as to whether two events are related, and if so, whether they occurred in a similar manner based on the attributes that match. Such information may be useful for determining a flow of processing in a cloud computer system. The flow may provide many uses, such as identifying errors in processing and improving processing efficiency based on an understanding of the flow of events in the cloud computer system.

According to at least one example, techniques may be provided for determining diagnostic information about a computing environment. Such techniques may be implemented by a computer system (e.g., a cloud computer system). The computer system may include one or more processors and one or more memory devices coupled to and readable by one or more processors. For example, the computing system may include a cloud server computer. The one or more memory devices may store a set of instructions that, when executed by the one or more processors, cause the one or more processors to perform the techniques disclosed herein. The techniques can include a computer-implemented method. The method may include receiving diagnostic data related to processing a request for a service provided by an enterprise computer system. The request may be processed by the computer system. The method may further include locating first diagnostic data in the diagnostic data. The first diagnostic data may correspond to a first event that occurs during processing of the request. The method may include identifying attribute data for each attribute of a plurality of attributes corresponding to an operation identified in the first diagnostic data. The attribute data may identify an executed function and operation information about the operation. The method may include generating a plurality of codes. Each code of the plurality of codes may be generated using the attribute data corresponding to a different attribute of the plurality of attributes. The method may include determining a first diagnostic identifier for the first event by combining the plurality of generated codes. The method may include determining a second diagnostic identifier for a second event that occurs during processing of the request. The second diagnostic identifier may be determined based on second diagnostic data in the diagnostic data corresponding to the second event. The method may include computing a value that indicates a measure of a match between the first diagnostic identifier and the second diagnostic identifier. The value may be computed by comparing the first diagnostic identifier to the second diagnostic identifier.

In some embodiments, the computer system, in the example above, may be a cloud computer system that is located at a first geographical location. The enterprise computer system may be located at a second geographical location that is different from the first geographical location of the computer system.

In some embodiments, diagnostic data may include stack trace data about one or more events. The first diagnostic data may correspond to a first call frame for the first event in the stack trace data. The second diagnostic data may correspond to a second call frame for the second event in the stack trace data.

In some embodiments, the method, in the example above, further includes receiving, from a mobile computing device, a request to allocate a computing resource for processing of a request for one or more services provided by the enterprise computer system. The method further includes allocating the computing resource in the computer system. Processing for the request for the service may be performed using the allocated computing resource. The method further includes detecting the first event during the processing of the request for the service.

In some embodiments, the attribute data in the example above further identifies class information for a class used by the executed function, package information for a package including the class, and component information for a component including the package.

In some embodiments, the operation information about the operation, in the example above, may identify an operation code identifying the operation and a line number in the executed function.

In some embodiments, each code of a plurality of codes may be generated using a hash operation.

In some embodiments, the attribute data, in the example above, may include first attribute data. The first attribute data may correspond to a first attribute of the plurality of attributes. The first attribute data may include a value for the first attribute corresponding to the operation identified in first diagnostic data.

In some embodiments, generating the code using the first attribute data, in the example above, may include performing a hash operation using the value in the first attribute data.

In some embodiments, the method, in the example above, may further include determining that the first diagnostic data is related to the second diagnostic data when the computed value satisfies a comparison threshold.

In some embodiments, comparing the first diagnostic identifier to the second diagnostic identifier, in the example above, may include comparing each generated code in the first diagnostic identifier to a corresponding generated code in the second diagnostic identifier.

In some embodiments, the value indicating the measure of the match, in the example above, may be computed using a ratio of generated codes that match based on comparing the first diagnostic identifier to the second diagnostic identifier.

In some embodiments, the value indicating the measure of the match, in the example above, may be computed based on an amount of the plurality of generated codes that match based on comparing the first diagnostic identifier to the second diagnostic identifier.

According to at least one example, techniques may be provided for determining diagnostic information about a computing environment. Such techniques may be implemented by a computer system (e.g., a cloud computer system). The computer system may include one or more processors and one or more memory devices coupled to the one or more processors. For example, the computer system may include a server computer. The one or more memory devices may containing instructions that, when executed on the one or more processors, cause the one or more processors to implement the techniques disclosed herein. The instructions, when executed on the one or more processors, cause the one or more processors to receive, from a mobile computing device using a first communication protocol, a request for a service. The service may be provided by an enterprise computer system. The instructions, when executed on the one or more processors, cause the one or more processors to convert the request for the service. The request may be converted to be sent to the enterprise computer system. The request may be converted from a first format of the first communication protocol to a second format of a second communication protocol. The instructions, when executed on the one or more processors, cause the one or more processors to receive diagnostic data from a diagnostics data store. The diagnostic data may be related to processing the request to be sent to the enterprise computer system. The instructions, when executed on the one or more processors, cause the one or more processors to locate first diagnostic data in the diagnostic data. The first diagnostic data may correspond to a first event that occurs during processing of the request. The instructions, when executed on the one or more processors, cause the one or more processors to identify attribute data for each attribute of a plurality of attributes corresponding to an operation identified in the first diagnostic data. The attribute data may identify an executed function and operation information about the operation. The instructions, when executed on the one or more processors, cause the one or more processors to generate a plurality of codes. Each code of the plurality of codes may be generated using the attribute data corresponding to a different attribute of the plurality of attributes. The instructions, when executed on the one or more processors, cause the one or more processors to determine a first diagnostic identifier for the first event by combining the plurality of generated codes. The instructions, when executed on the one or more processors, cause the one or more processors to determine a second diagnostic identifier for a second event that occurs during processing of the request. The second diagnostic identifier may be determined based on second diagnostic data in the diagnostic data corresponding to the second event. The instructions, when executed on the one or more processors, cause the one or more processors to compute a value that indicates a measure of a match between the first diagnostic identifier and the second diagnostic identifier. The value may be computed by comparing the first diagnostic identifier to the second diagnostic identifier. In some embodiments, the diagnostic data may include a stack trace data about one or more events. In such embodiments, the first diagnostic data may correspond to a first call frame for the first event in the stack trace data and the second diagnostic data may correspond to a second call frame for the second event in the stack trace data. In some embodiments, the first event may correspond to an error event that occurs during the operation identified in the first diagnostic data. In some embodiments, the instructions, when executed on the one or more processors, cause the one or more processors to receive, from the enterprise computer system via the second communication protocol, a response to the request for the service. In such embodiments, the instructions, when executed on the one or more processors, cause the one or more processors to convert the response received from the enterprise computer system using the second communication protocol. The response may be converted from the second format of the second communication protocol to the first format of the first communication protocol. In such embodiments, the instructions, when executed on the one or more processors, cause the one or more processors to send the converted response to the mobile computing device.

According to at least one example, techniques may be provided for determining diagnostic information about a computing environment. Such techniques may be implemented by a computer system (e.g., a cloud computer system). The computer system may include one or more processors and a computer-readable memory by the one or more processors. For example, the computer system may include a server computer. The computer-readable memory may store a set of instructions that, when executed by one or more processors, causes the one or more processors to implement one or more techniques disclosed herein. The set of instructions, when executed on the one or more processors, causes the one or more processors to receive diagnostic data related to processing a request for a service provided by an enterprise computer system. The request may be processed by a computer system. The set of instructions, when executed on the one or more processors, causes the one or more processors to locate first diagnostic data in the diagnostic data. The first diagnostic data may correspond to a first event that occurs during processing of the request. The set of instructions, when executed on the one or more processors, causes the one or more processors to identify attribute data for each attribute of a plurality of attributes corresponding to an operation identified in the first diagnostic data. The attribute data may identify an executed function and operation information about the operation. The set of instructions, when executed on the one or more processors, causes the one or more processors to generate a plurality of codes. Each code of the plurality of codes may be generated using the attribute data corresponding to a different attribute of the plurality of attributes. The set of instructions, when executed on the one or more processors, causes the one or more processors to determine a first diagnostic identifier for the first event by combining the plurality of generated codes.

The set of instructions, when executed on the one or more processors, causes the one or more processors to determine a second diagnostic identifier for a second event that occurs during processing of the request. The second diagnostic identifier may be determined based on second diagnostic data in the diagnostic data corresponding to the second event. The set of instructions, when executed on the one or more processors, causes the one or more processors to compute a value that indicates a measure of a match between the first diagnostic identifier and the second diagnostic identifier. The value may be computed by comparing the first diagnostic identifier to the second diagnostic identifier. In some embodiments, comparing the first diagnostic identifier to the second diagnostic identifier may include comparing each generated code in the first diagnostic identifier to a corresponding generated code in the second diagnostic identifier. In such embodiments, each generated code may correspond to a distinct attribute and the measure of the match may be computed using a ratio of generated codes that match based on comparing the first diagnostic identifier to the second diagnostic identifier.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The following detailed description together with the accompanying drawings will provide a better understanding of the nature and advantages of the present invention.

BRIEF DESCRIPTION OF THE DRAWINGS

Illustrative embodiments of the present invention are described in detail below with reference to the following drawing figures.

DETAILED DESCRIPTION

Figure 1:
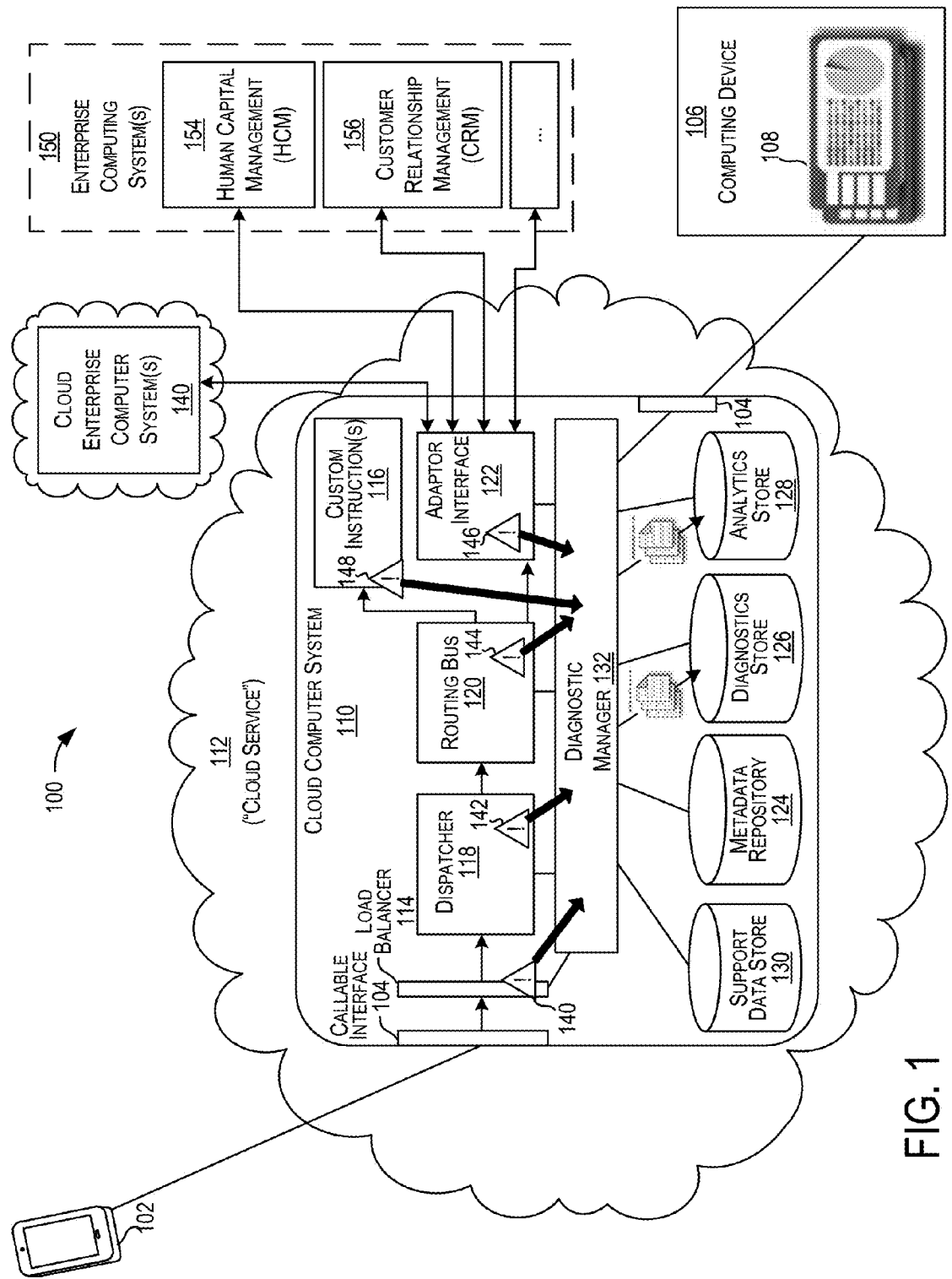
FIG. 1 shows a block diagram of a computing environment according to some embodiments of the present invention.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computer system.

Techniques are described for determining diagnostic information about a computing environment. In particular, diagnostic information, e.g., a diagnostic identifier, may be generated for one or more events occurring in a cloud computer system. An event may correspond to processing performed by the cloud computer system to facilitate communication of a request, from a computing device (e.g., a mobile phone), for a service provided by one or more enterprise computer systems. The generated diagnostic information can be used to understand or trace one or more events occurring in the cloud computer system.

In some embodiments, a diagnostic identifier may be generated based on diagnostic data corresponding to an event. The diagnostic data (e.g., stack trace data) may include information corresponding to one or more attributes about the event. A computing operation (e.g., a hash operation) may be performed to generate a code (e.g., a hash code) for each attribute in the diagnostic data. In some embodiments, a code may be generated based on diagnostic data corresponding to multiple attributes about the event. The generated code(s) may be combined to form a diagnostic identifier to identify the diagnostic data for the event.

In some embodiments, a comparison can be performed between two diagnostic identifiers, each of which corresponds to a different event occurring in a cloud computer system. A comparison may be performed by comparing each code in one diagnostic identifier to a code in another diagnostic identifier corresponding to an attribute for which the codes were generated. A measure of a match between the two identifiers may be determined using a result of the comparison. A measure of a match can indicate a ratio of matching codes or the amount of codes that match. Based on the codes that match, one can determine whether an event corresponding to each identifier are related and if so, based on the attributes corresponding to the codes that match. A result of a comparison between two identifiers based on their respective codes may result in an indication as to whether two events are related, and if so, whether they occurred in a similar manner based on the attributes that match. Such information may be useful for determining a flow of processing in a cloud computer system. The flow may provide many uses, such as identifying errors in processing and improving processing efficiency based on an understanding of the flow of events in the cloud computer system.

FIG. 1 shows a block diagram of a computing environment 100 to according to some embodiments of the present invention. For purposes of illustration, various examples are provided herein to describe techniques for facilitating communication between a computing device (e.g., computing device 102) and one or more enterprise computer systems, such as a cloud enterprise computer system 140 (e.g., "serviceprovider.com") and an enterprise computer system 150. Such communications may occur to exchange or transfer enterprise data, request services provided by an enterprise computer system, communicate messages, or combinations thereof. In some embodiments, computing environment 100 may enable a user to obtain diagnostic information related to processing performed to facilitate the communication between the computing device and an enterprise computer system and/or processing performed for operations resulting from the communication.

Diagnostic information may include information that may enable one to understand and determine operation of a computing environment, e.g., computing environment 100. For example, diagnostic information may enable one to understand and diagnose processing performed by cloud computer system 110. Diagnostic information may include one or more diagnostic identifiers, such as a diagnostic identifier generated by techniques described herein. Diagnostic information may be generated based on diagnostic data. An example of a diagnostic identifier is described below with reference to FIG. 3.

Diagnostic data may include data, such as one or more logs, one or more diagnostic records, one or more event records, error data, dump data, request data, debugging information, system data, memory data, computing history, other data including information that can be used to determine diagnostic information, or combinations thereof. Diagnostic data may include information about operation(s), instruction(s), requests, traffic, communication(s), other system information, or combinations thereof, which may be identified in computing environment 100. Examples of diagnostic data may be described with reference to FIG. 3. In some embodiments, diagnostic data may include data (e.g., attribute data) corresponding to one or more operations. For example, diagnostic data may include data (e.g., call frame data or stack frame data) corresponding to a frame, such as a call frame or a stack frame. Diagnostic data may include data corresponding to one or more attributes related to an operation. For example, the attributes may include, without restriction, a component name, a package name, a class name of a package (e.g., a first class name or a last class name), a method/function name, lock information (e.g., a lock name), a wait name, a line number, other attribute data, or combinations thereof. In some embodiments, the data corresponding to an attribute may not exist in data for each operation identified in the diagnostic data. Diagnostic data may be generated immediately or sooner after operation occurs in cloud computer. In some embodiments, diagnostic data may include information (e.g., one or more attributes) that can be used to identify data corresponding to an event that occurs in a computing environment. The data corresponding to an event may include data corresponding to a plurality of operations. In some embodiments, a data corresponding to an event may correspond to a frame of data (e.g., stack frame data).

Messages may include service invocation messages, result messages, request messages, other messages communicated internally, other messages communicated between a computing device and an enterprise computer system, or combinations thereof. A message may include a message type (e.g., a type value from a set of shared type constants), a correlation id (e.g., an id used to correlate this message with one or more other messages), priority information to support for priority based message queues, timeout, sensitivity indicator to support message data isolation, message source (e.g., a uniform resource identifier of a sender), a message destination (e.g., a uniform resource identifier that uniquely identifies the destination, a request context (e.g., request information from dispatcher), and/or a message payload. The payload may have different attributes depending upon the type of message that is being sent, such as parameter data and result data.

Enterprise data as described herein may include data received from an enterprise computer system, data sent to an enterprise computer system, data processed by an enterprise computer system, or combinations thereof. The enterprise data may be distinguishable from data for consumer applications and/or services. In some embodiments, for example, enterprise data may change based on application or use of the enterprise data, whereas data for consumer applications (e.g., consumer data) may remain static through use. In some embodiments, enterprise data may include or be associated with rules that indicate criteria for storing, using, and/or managing the enterprise data. For example, enterprise data may be associated with policy information that indicates one or more policies for storing, using, and/or managing the enterprise data. In some embodiments, policy information may be included in enterprise data. In some embodiments, enterprise data may include data processed, stored, used, or communicated by an application or a service executing in an enterprise computer system. For example, enterprise data may include business data (e.g., business objects) such as JSON (JavaScript Object Notation) formatted data from enterprise applications, structured data (e.g., key value pairs), unstructured data (e.g., internal data processed or used by an application, data in JSON format, social posts, conversation streams, activity feeds, etc.), binary large objects (BLOBs), documents, system folders (e.g., application related folders in a sandbox environment), data using representational state transfer (REST) techniques (referred to herein as "RESTful data") (e.g., synchronization data made available by REST endpoints), system data, configuration data, synchronization data, or combinations thereof. In some embodiments, enterprise data may include REST-formatted enterprise data. REST-formatted enterprise data may include RESTful data. REST-formatted data may include data formatted according to REST techniques implemented by an enterprise computer system. Configuration or synchronization data may include data used for synchronization of enterprise data, such as versions, history, integration data, etc. Documents in enterprise data may include extended markup language (XML) files, visual assets, configuration files, media assets, etc. A BLOB may include a collection of binary data stored as a single entity in a database management system, such as an image, multimedia object, or executable code, or as otherwise known in the art. In some embodiments, enterprise data may include diagnostic information related to processing performed to facilitate the communication between a computing device and an enterprise computer system and/or processing performed for operations resulting from the communication.

An enterprise computer system may include various computing systems that are configured to operate for an entity or an enterprise. For example, an enterprise computer system may include one or more computer systems, such as an enterprise server computer (e.g., a back-end server computer), to handle requests for services. An enterprise computer system may include applications and/or services, which can process and/or operate using enterprise data. For example, enterprise computer system 150 may provide one or more services and/or applications for managing or operating an enterprise. Services may include, without restriction, customer relationship management (CRM), human capital management (HCM), human resource (HR) management, supply chain management, enterprise communication, email communication, business services, other enterprise management services or applications, or combinations thereof. Enterprise computer system 150 may include one or more computer systems dedicated to providing one or more services. In some embodiments, each different computer system providing a service may be located on-premise of an enterprise or may be located remotely from an enterprise. In some embodiments, multiple different computer systems supporting different services may be situated in a single geographical location, such as on-premises of an enterprise. In the example shown in FIG. 1, on-premises enterprise computer system 150 may include an HR system 154 and a CRM system 156, both of which may be located on-premises of an enterprise. In some embodiments, enterprise computer system 140 may include or implement an agent system to facilitate or handle communication between cloud computer system 110 and one or more enterprise systems 154, 156. Enterprise computer systems, such as cloud enterprise computer system 140 and on-premises enterprise computer system 150 are described below in further detail.

Computing environment 100 may include a cloud service 112 implemented to operate as a secure intermediary computing environment that may facilitate communication between the computing device 102 and one or more enterprise computer systems because computing device 102 may not be configured to communicate with such enterprise computer systems. In some embodiments, cloud service 112 may be implemented to enable mobile computing devices to communicate with enterprise computer systems. For example, some enterprise computer systems may be supported by legacy or back-end computer systems. Such systems may be configured to operate using different communication and/or security protocols. The protocols supported by such enterprise computer systems may be different from those supported by mobile computing devices. Cloud service 112 may support communication with different types of mobile computing devices. As such, cloud service 112 may implement techniques to facilitate communication between enterprise computer systems and mobile computing devices to enable them to communicate with each other despite their incompatibilities in communication, such as differences between formats or communication protocols. For example, cloud service 112 may translate communication protocols between mobile computing devices and enterprise computer systems.

Cloud service 112 may provide its users with many advantages. Cloud service 112 may perform operations to determine diagnostic information, e.g., a diagnostic identifier. Such operations may enable a user to identify a relationship in related diagnostic information based on one or more attributes corresponding to diagnostic data used to generate the diagnostic information. The related diagnostic information may assist a user in identifying related operations occurring in computing environment 100. The related operations may be useful to determine a state or flow of execution in cloud computer system 110 at any given time based on diagnostic identifiers for operations performed in cloud computer system 110. In some embodiments, diagnostic information may be generated for an event that occurs in computing environment 100. The event may correspond to one or more operations. The diagnostic information, such as a diagnostic identifier of operations, may collectively provide an indication as to a flow of execution in cloud computer system 110. The flow of execution may be useful to identify repeated or frequent operations. The flow of execution may enable one to identify operations related to an event. A relationship between operations may assist one in determining repeated or frequent events, which can be useful to identify recurring problems and/or improve efficiency of operations.

Cloud computer system 110 may support cloud service 112. Cloud computer system 110 may be implemented using hardware, software, firmware, or combinations thereof. For example, cloud computer system 110 may include one or more computing devices, such as a server computer. Cloud computer system 110 may include one or more memory storage devices and one or more processors. A memory storage device can be accessible to the processor(s) and can include instructions stored thereon which, when executed by the processor(s), cause the processor(s) to implement one or more operations disclosed herein. In some embodiments, the memory storage devices may operate as local storage (e.g., cache). Cloud computer system 110 may include different kinds of operating systems. A memory storage device may be accessible to the processor(s) and may include instructions stored thereon which, when executed by the processor(s), cause the processor(s) to implement one or more operations, methods, or processes disclosed herein. The memory storage may operate as local storage. Local storage may be implemented using any type of persistent storage device, such as a memory storage device or other computer-readable storage medium. In some embodiments, local storage may include or implement one or more databases (e.g., a document database, a relational database, or other type of database), one or more file stores, one or more file systems, or combinations thereof. The local storage may store enterprise data.

In certain embodiments, cloud computer system 110 may include one or more data stores, such as a metadata repository 124, diagnostics store 126, and an analytics store 128. The data stores 124, 126, 128 may be accessible by any component in cloud computer system 110.

Metadata repository 124 may store all the metadata associated with cloud service 112. This information may be composed of both run-time and design-time data, each having their own requirements on availability and performance. A tenant or subscriber of cloud service 112 may have any number of applications. Each application may be versioned and may have an associated zero or more versioned resource APIs and zero or more versioned services implementations those resource application programming interface (API) contracts. These entities are what the run-time uses to map virtual requests (mAPIs) to the concrete service implementation (service). This mapping provides a mobile developer with the luxury of not having to know the actual implementation service when she designs and builds her application. As well as not requiring her to have to republish a new application on every service bug fix. Metadata repository 124 may store one or more callable interfaces 104, which may be invoked by a computing device (e.g., computing device 102 or a computing device 106). The callable interfaces 104 may be customizable by a user (e.g., a developer) of an application to facilitate communication with cloud service 112. Metadata repository 124 may store metadata corresponding to one or more configurations of a callable interface 104. Metadata repository 124 may be configured to store metadata for implementing callable interface 104. Callable interface 104 may be implemented to translate between a one format, protocol, or architectural style for communication and another format, protocol, or architectural style for communication. Metadata repository 124 may be modifiable by an authenticated user via the external network.

Diagnostics store 126 may store diagnostics information about operations, processing, events, other actions, or combinations thereof occurring in cloud service 112. Diagnostics store 126 may store messages communicated via cloud service 112 and log information. In some embodiments, diagnostics store 126 may store diagnostic data corresponding to processing performed in computing environment 100. In some embodiments, diagnostics store 126 may store diagnostic information, e.g., one or more diagnostic identifiers generated by cloud computer system 100. Analytics store 128 may store logging and analytics data captured during processing in the system. In some embodiments, analytics store 128 may store diagnostic information, e.g., one or more diagnostic identifiers generated by cloud computer system 100.

On behalf of cloud service 112, cloud computer system 110 may utilize its computing resources to enable execution of custom instructions 116 (e.g., operations, applications, methods, functions, routines, or the like). Computing resources may be allocated for use with respect to a particular user associated as a subscriber or tenant to cloud service 112. Resources may be allocated with respect to a user, a device, an application, or other criterion related to a subscriber. Cloud service 112 may be scaled in or out, depending on the demand of mobile computing devices seeking to communicate with enterprise computer systems. Cloud service 112 can be configured such that it is elastic to handle surges and temporary periods of higher than normal traffic between mobile computing devices and enterprise computer systems. In some embodiments, cloud service 112 may include elements that support scalability such that components may be added or replaced to satisfy demand in communication.

Computing device 102 may communicate (e.g., send a request message) with cloud service 112 to request service provided by an enterprise computer system. Computing device 102 (e.g., a mobile computing device) may be implemented using hardware, firmware, software, or combinations thereof. Computing device 102 may communicate with enterprise computer systems 140, 150 via cloud service 112. Computing device 102 may include or may be implemented as an endpoint device, a personal digital assistant (PDA), a tablet computer, a laptop computer, a mobile computing device, a desktop computer, a wearable computer, a pager, etc. Computing device 102 may include one or more memory storage devices and one or more processors. Computing device 102 may include different kinds of operating systems. A memory storage device may be accessible to the processor(s) and may include instructions stored thereon which, when executed by the processor(s), cause the processor(s) to implement one or more operations, methods, or processes disclosed herein. The memory storage may operate as local storage. Local storage may be implemented using any type of persistent storage device, such as a memory storage device or other computer-readable storage medium. In some embodiments, local storage may include or implement one or more databases (e.g., a document database, a relational database, or other type of database), one or more file stores, one or more file systems, or combinations thereof. The local storage may store enterprise data.

Computing device 106 may communicate with cloud service 112 for management of diagnostic operations. Computing device 106 may provide diagnostic data to cloud computer system 110. Computing device 106 can receive diagnostic information from cloud computer system 110 to diagnose operation of computing environment 100, specifically cloud computer system 110. Computing device 106 may be implemented using hardware, firmware, software, or combinations thereof. Computing device 102 may communicate with enterprise computer systems 140, 150 via cloud service 112. Computing device 102 may include or may be implemented as an endpoint device, a PDA, a tablet computer, a laptop computer, a mobile computing device, a desktop computer, a wearable computer, a pager, etc. Computing device 102 may include one or more memory storage devices and one or more processors. Computing device 102 may include different kinds of operating systems. A memory storage device may be accessible to the processor(s) and may include instructions stored thereon which, when executed by the processor(s), cause the processor(s) to implement one or more operations, methods, or processes disclosed herein. The memory storage may operate as local storage. Local storage may be implemented using any type of persistent storage device, such as a memory storage device or other computer-readable storage medium. In some embodiments, local storage may include or implement one or more databases (e.g., a document database, a relational database, or other type of database), one or more file stores, one or more file systems, or combinations thereof. The local storage may store enterprise data.

In various embodiments, computing device 102 and/or computing device 106 may be configured to execute and operate one or more applications such as a web browser, a client application, a proprietary client application, or the like. The applications can include specific applications configured for enterprise data and/or services provided by an enterprise computer system. Client applications may be accessible or operated via one or more network(s). Applications may include a graphical user interface (GUI) for operating the application. In some embodiments, computing device 106 may present an interface 108 for diagnostic management. Through interface 108, a user can access diagnostic information determined by cloud computer system 110. Using interface 108, a user can provide diagnostic data to cloud computer system 110.

Each of computing devices 102, 106, may communicate with cloud service 112 via one or more communication networks using wireless communication. Examples of communication networks may include a mobile network, a wireless network, a cellular network, a local area network (LAN), a wide area network (WAN), other wireless communication networks, or combinations thereof. In certain embodiments, computing devices 102, 106 may establish a communication connection 114 with cloud service 112 using a custom communication protocol (e.g., a custom protocol). Connection 114 may be established with cloud service 112 through cloud computer system 110. The custom protocol may be an HTTP-based protocol. By utilizing a custom communication protocol, computing device 102 and computing device 106 may operate on any computing device platform to communicate with cloud computer system 110.

Computing device 102 and computing device 106 may communicate with cloud computer system 110 through one or more callable interfaces, e.g., application programming interfaces (APIs) 104. A callable interface may be implemented on computing device 102. A callable interface 104 may be implemented for custom applications that enable those applications to communicate with cloud service 112. In some embodiments, a callable interface may be developed for cloud service 112. The callable interface may enable applications to communicate with cloud service 112 without having to adapt to differences in protocols (e.g., communication or development protocols) and/or architectural styles or formats.

Cloud service 112 may be protected by one or more firewalls to provide a secure environment to process requests and execute custom instructions 116. Communication between computing devices 102, 106 and cloud service 112 may be separated by an external communication firewall. The firewall may be connected with cloud computer system 110 to facilitate secure access to cloud service 112. A firewall may permit communication of messages between cloud computer system 110 and computing devices (e.g., computing device 102). Such messages (e.g., HTTP messages or REST messages) may conform to a communication protocol (e.g., HTTP or REST), which may be supported by a callable interface. In another example, a message between cloud computer system 110 and computing device 102 may conform to a communication protocol such as Speedy (SPDY). Cloud service 112 may manage a firewall to secure communication between cloud computer system 110 and enterprise computer systems 140, 150. A firewall may permit communication of messages between cloud computer system 110 and computing devices (e.g., computing device 102). Such messages (e.g., SPDY messages, HTTP messages or REST messages) may conform to a communication protocol (e.g., SPDY, HTTP, or REST). Communication between computing device 102 and enterprise computer systems 140, 150 may be two-way via MCS 112.

Because communication with computing device 102 and enterprise computer systems 140, 150 may occur via an unsecure, public network, one or more firewalls may provide an added layer of protection for communications to and from cloud service 112. One or more firewalls may enable cloud service 112 to distinguish its internal network from an external network connecting computing device 102 and enterprise computer systems 140, 150. In some embodiments, multiple firewalls may be implemented as a single firewall that encapsulates cloud service 112.

Cloud computer system 110 may further operate as an intermediary computing environment by communicating with enterprise computer systems, some of which may have different communication protocols. Such communication protocols may be custom or specific to an application or service in communication with cloud computer system 110. Further, cloud computer system 110 may communicate with an enterprise computer system to provide enterprise services and/or to exchange enterprise data according to a format supported by the enterprise computer system. Cloud computer system 110 may maintain local storage (e.g., local cache) of enterprise data and may use the local storage to manage synchronization of the enterprise data between mobile computing devices and enterprise computer systems 140, 150.

Computing device 102 may communicate (e.g., send a request message) with cloud service 112 to request service provided by an enterprise computer system. A request that is received through a firewall may be processed to manage security authentication for a user associated with a request. In some embodiments, security authentication may be determined for a request, a session, a user, a device, other criterion related to the user, or combinations thereof. Security authentication may be performed for each request that is received. In some embodiments, authentication may be determined based on a previous verification of a request. Security authentication may be determined for a user or a device such that requests to different enterprise computer systems 140, 150 may be authenticated based on a single verification of security.

Cloud computer system 110 may enable a computing device to communicate with various enterprise computer systems, some of which may be implemented differently. For example, a computing device 302, cloud computer system 110, and enterprise computer system 150 may be located at different geographical locations, physically separated from each other. Therefore, computing device 302 can communicate with enterprise computer system 150 regardless of their location. Technical advantages may include a cloud computer system enabling a computing device to communicate requests for services to enterprise computer systems, which may support one or more distinct security protocols. In some cases, an enterprise computer system may be supported by a back-end system that is not easily adaptable to a different security protocol. In some cases, it may be desirable for developers of applications to be able to implement an application to be able to request services without knowledge of such security protocols. It may be equally desirable for a user (e.g., an administrator or an architect) of an enterprise computer system to be able to receive requests without accommodating for different types of applications, security protocols, and standards. Technical advantages may enable such desires to be met by implementation of a cloud computer system, as described herein, which can handle security authentication, such that requests can meet the security measures of different enterprise computer systems that are being requested.

In some embodiments, a security protocol may be determined for a requested enterprise computer system. A security token may be generated according to such security protocol. The security token may be passed along with a request to an enterprise computer system to enable that enterprise computer system to verify authentication based on the generated security token. Enterprise computer systems may support different security protocols. A security protocol may be a standard by which security is determined. Security may be verified based on a security token that is generated. A security protocol may be identified for an enterprise computer system identified for a request. In some embodiments, an enterprise computer system 150 may have an agent system, which may be configured or implemented according to a custom or specific security protocol supported by cloud service 112. As such, cloud service 112 may generate a security token according to such custom security protocol.

Cloud computer system 110 may include, implement, and/or communicate with one or more load balancer systems 114. Upon determining security authentication, cloud computer system 110 may request any one of load balancer systems 114 to examine a request that it receives and to detect which service the request is directed to. Cloud service 112 may be configured with one or more load balancer systems 114 and updated with resources that get started up, so that when a request comes in, one of load balancer systems 114 can balance a requested load across the different resources.

Cloud computer system 110 may include a dispatcher 118 that may handle requests and dispatch them to the appropriate service. A request may be routed to an appropriate service upon dispatch. In some embodiments, a service itself may route an internal request to another internal service in cloud service 112 or in an enterprise computer system. In some embodiments, dispatcher 118 may resolve a request to determine its destination based on a location (e.g., an address) of a destination identified in a uniform resource identifier (URI) and/or a uniform resource locator (URL) of the request. Dispatcher 118 may parse a request and its header to extract one or more of the following information: tenant identifier, service identifier, application name, application version, request resource, operation and parameters, etc. Dispatcher 118 can use the parsed information to perform a lookup in metadata repository 124. Dispatcher 118 may retrieve a corresponding application metadata. Dispatcher 118 may determine the target service based on the requested resource and the mappings in the metadata. While initially a very basic mapping, the metadata can be enhanced to provide for more sophisticated, rules-based dispatching. Dispatcher 118 may perform any dispatcher-specific logging, metrics gathering, etc. Dispatcher 118 may then perform initial authorization according to the application metadata. Dispatcher 118 may format the inbound request and any other necessary information and place the message on routing bus 120 for further processing. Dispatcher 118 may place a request on a queue and await the corresponding response. Dispatcher 118 may process responses received from routing bus 120 and return a response to computing device 102.

In addition to handling the dispatching for external requests, dispatcher 118 may also play a role in dispatching internal requests. Such internal requests can come in the form of composite services or custom code invocations to services. In both cases, the caller could use a logical service name as defined within the application. Dispatcher 118 may use the current execution context to determine the application and use that logical name to determine the appropriate service to invoke.

Cloud computer system 110 may include a routing bus 120 to manage deliver of messages to destinations registered with routing bus 120. Routing bus 120 may operate as a central system for managing communications in cloud service 112. Data communicated through routing bus 120 may be processed to capture and store the data. Routing bus 120 may provide a framework so that additional centralized services (additional authorization, debugging, etc.) can be plugged in easily as necessary. Data captured by routing bus 120 may be stored in diagnostics store 126 and/or analytics store 128.

Routing bus 120 may route messages to one or more destinations. In some embodiments, a message may include a request to execute custom instructions 116. Routing bus 120 may request custom instructions 116 to be invoked for a request to execute custom instructions 116. In some embodiments, routing bus 120 may pass on a request to a destination enterprise computer system identified by information in a request. Routing bus 120 may request an adaptor interface 122 to perform translations, if necessary, to pass a request to an enterprise computer system, e.g., enterprise computer system 140 or enterprise computer system 150.

In certain embodiments, cloud computer system 110 may include or implement adaptor interface 122 to translate or convert a message to a protocol supported by a receiving enterprise computer system. Adaptor interface 122 may establish separate communication connections with each of enterprise computer systems 140, 150. Cloud computer system 110 may be configured to communicate with enterprise computer systems 140, 150 via one or more networks (not shown). Examples of communication networks may include the Internet, a mobile network, a public network, a wireless network, a cellular network, a local area network (LAN), a wide area network (WAN), other communication networks, or combinations thereof. In certain embodiments, communication connections may be high-speed communication connections facilitated using high-speed communication trunks. Communication with an enterprise computer system 140, 150 may pass through a firewall, which ensures that communication with an external network is secure to prevent unauthorized access to cloud service 112 via such communications.

Cloud computer system 110 may include a diagnostic manager 132. Diagnostic manager 132 may determine diagnostic information (e.g., a diagnostic identifier) corresponding to one or more operations performed in cloud computer system 110. One or more operations may correspond to an event. For example, a diagnostic identifier may be generated based on processing performed for a request for a service provided by any one of enterprise computer systems 150. As will be described further below, diagnostic information may be generated based on one or more attributes identified in diagnostic data corresponding to an event. Diagnostic data may be received by diagnostic manager 132 from a local store accessible to cloud computer system 110 and/or from an external computing system. A computing operation (e.g., a hash operation) may be performed to generate a code (e.g., a hash code) for one or more attributes in the diagnostic data. The generated code(s) may be combined to form a diagnostic identifier to identify the diagnostic data for the event. Information determined by diagnostic manager 132 may be stored in diagnostics store 126 and/or analytics store 128.

In some embodiments, an event may correspond to one or more operations performed in cloud computer system 110 and/or more or more other computing systems. In some embodiments, an event may correspond to a plurality of operations performed in cloud computer system 110. The plurality of operations may correspond to a frame, e.g., a call frame or a stack frame. In some embodiments, the plurality of operations corresponding to an event may be performed in one of a plurality of components of cloud computer system 110. An event may correspond to an error, a function, a call, an operation or combinations thereof. The plurality of operations may include operations performed in load balancer 114, dispatcher 118, routing bus 120, custom instructions 116, and/or adaptor interface 122. For example, an event may correspond to an event 140 in load balancer 114, an event 142 in dispatcher 118, an event 144 in routing bus 120, an event 148 during operation of a custom instruction 116, or an event in adaptor interface 122. In some embodiments, an event can occur in any one of enterprise computing system(s) 150. For example, one event which may occur in cloud computer system 110 is an operation performed during processing of a request for a service provided by an enterprise computer system.

Diagnostic manager 132 may compare diagnostic information (e.g., a diagnostic identifier) corresponding to two different events that occurred in the cloud computer system 110. The diagnostic information may be compared to determine a relationship, if one exists, between the two different events. In some embodiments, the diagnostic identifier corresponding to each event may be compared to determine a measure of a match between the two diagnostic identifiers. A measure of a match can indicate a ratio of matching information (e.g., a code) codes or the amount of codes that match. Based on the codes that match, one can determine whether an event corresponding to each identifier are related and if so, based on the attributes corresponding to the codes that match. A result of a comparison between two identifiers based on their respective codes may enable one to determine a degree in which two events are related, and if so, whether they occurred in a similar manner based on the attributes that match. Such information may be useful for determining a flow of processing in a cloud computer system. The flow may provide many uses, such determining a source of an error or understanding processing to determine ways to optimize operations.

In some embodiments, cloud computer system 110 may perform one or more operations to provide information to a user, e.g., a user of computing device 102, that may enable the user to remain informed about a status of processing in cloud computer system 110. In some embodiments, cloud computer system 110 may facilitate notifications to a user of computing device 102. Cloud computer system 110 may include an alert management service that supports stateful interaction with a user, for example to deliver an alert based on user preferences through one or more channels, wait for a response, and take action based on the response. Responses to an alert sent on one channel may be received through another channel, which the service needs to be able to handle. The platform may come with built-in state models for popular interaction patterns and be extensible with new state models. Some alert channels may include known communication resources, either one-way or two-way. Examples include SMS, Twitter®, push notifications, and Google Cloud Messaging®.

In some embodiments, cloud computer system 110 may enable computing device to access and/or request one or more services, such as an object store service, database service, access web services, social services, resource services, or combinations thereof.

Cloud computer system 110 may provide an object store service that may provide a storage facility for BLOBs. The basic unit of storage can be text, with read and write operations. A basic query facility for JSON objects may also be offered.

Cloud computer system 110 may provide a database service to allow for connectivity to hosted databases for performing queries or writes. Required parameterization may require the full connection string for the database, the SQL string or stored procedure to execute, any parameters and possibly credentials. The necessary information can be provided at run time or be pre-configured in the application metadata.

Cloud computer system 110 may provide access to web services such as Simple Access Object Protocol (SOAP) web services. Cloud computer system 110 may provide access to REST services, such as connectivity to arbitrary REST resources.

Cloud computer system 110 may provide access to social services that may provide basic integration with many of the popular social sites such as Facebook®, Twitter®, etc. These services may allow for third party authentication using the user's credentials from those sites as well as access to their services. Examples include sending a tweet or updating your status.

Cloud computer system 110 may provide a public cloud service to enable a user to simplify and optimize communication. For example, a service developer may use the generic web service of cloud service 112 to talk to a resource hosted using cloud computer system's 110 cloud service.

A cloud computer system, such as one described herein, may provide diagnostic information, such as a diagnostic identifier that can be used to determine additional information for diagnosing operation in a cloud computer system. The additional diagnostic information may identify information related to an event, such that one can ascertain attributes related to operations performed for the event. The use of the diagnostic information may reduce time for determining operations performed for an event.

A diagnostic identifier may be compared with other diagnostic identifiers to quickly determine whether a relationship exists between the diagnostic identifiers without having to analyze details of diagnostic data. The relationship may enable one to focus on diagnostic data corresponding to the diagnostic identifiers, which may be related. In doing so, diagnostic data can be processed more quickly to identify a source of an error or processing inefficiencies.

Figure 2:
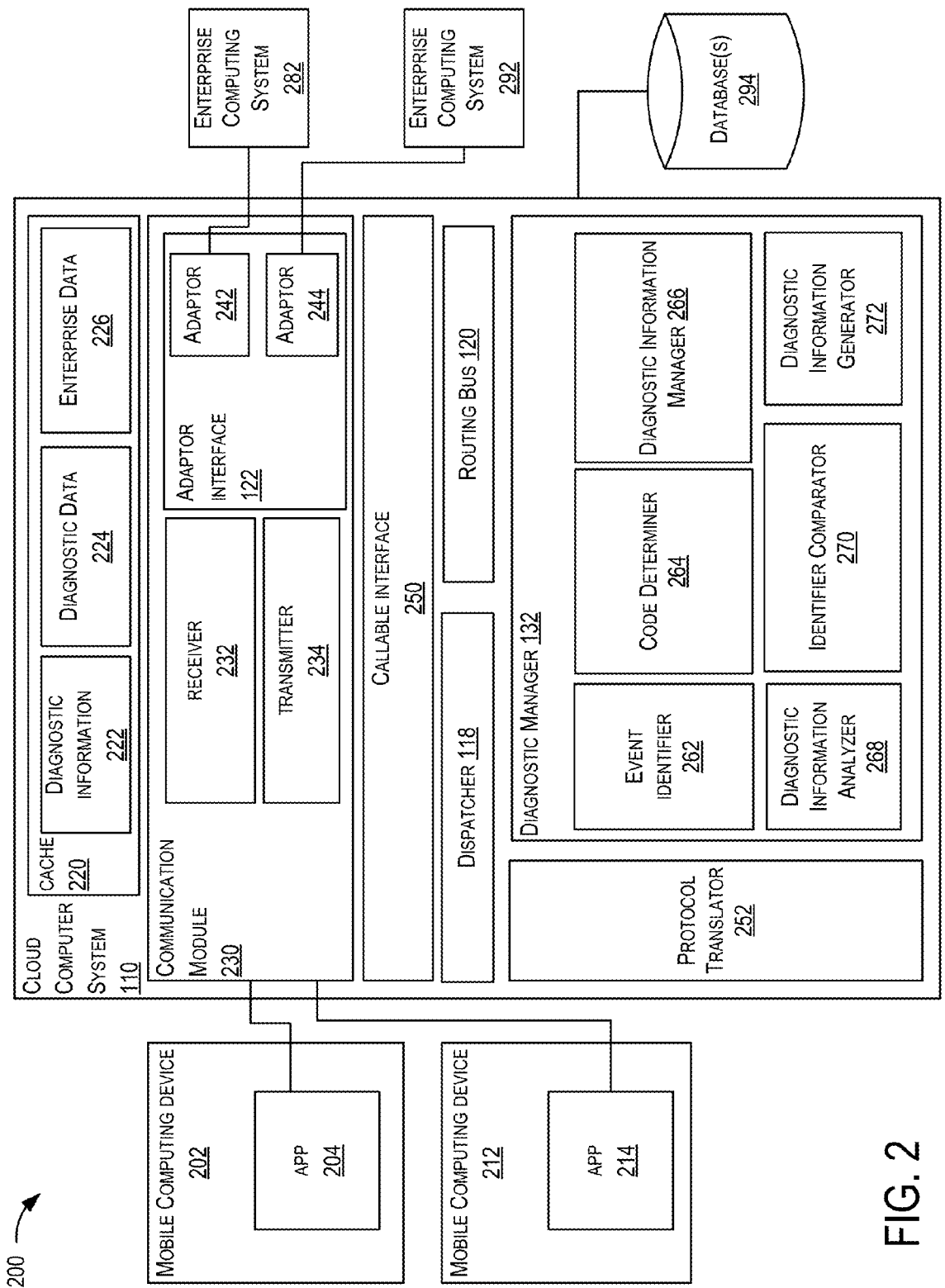
FIG. 2 shows a block diagram of a computing environment according to some embodiments of the present invention.

Now turning to FIG. 2, a block diagram is shown of a computer environment 200 that may determine diagnostic information according to some embodiments of the present invention. Computer environment 200 may include cloud computer system 110. In certain embodiments, cloud computer system 110 may be implemented as one or more functional blocks or modules configured to perform various operations for generating and/or processing diagnostic information. Cloud computer system 110 may include communication module 230, callable interface 250, diagnostic manager 132, dispatcher 118, routing bus 120, and protocol translator 252.

Cloud computer system 110 may include one or more memory storage devices ("local storage"), such as cache 220. Cache 220 may be used to store diagnostic information 222, diagnostic data 224, and enterprise data 226. Enterprise data 226 may be received from enterprise computer systems 282, 292, may be received from mobile computing devices 202, 212, and/or may be generated (e.g., converted) by cloud computer system 110 from enterprise data received from enterprise computer systems 282, 292 or from mobile computing devices 202, 212. Diagnostic information 222 may be generated by cloud computer system 110 based on diagnostic data 224. Diagnostic data 224 may be produced by cloud computer system 110, may be received from one or more external computing systems (e.g., enterprise computer system 282) may be received from one or more data sources (e.g., database 294), or combinations thereof.

Communication module 230 may be configured to manage communications between cloud computer system 110 and multiple enterprise computer systems, e.g., enterprise computer systems 282, 292. To facilitate communication, communication module 230 may be equipped with hardware to enable communication, such as a receiver 232 and a transmitter 234, or a combination thereof.

Enterprise computer systems, such as enterprise computer systems 282, 292, may be physically located beyond a firewall of cloud computer system 110 at a different geographic location (e.g., remote geographic location) than cloud computer system 110. In some embodiments, enterprise computer system 282 may be different from enterprise computer system 292. In some embodiments, enterprise computer system 282 and enterprise computer system 292 may be part of a single computer system. Each of enterprise computer systems 282, 292 may communicate with cloud computer system 110 using a different communication protocols. Enterprise computer system 282 and enterprise computer system 292 may support the same or different security protocols. In some embodiments, enterprise computer system 282 and/or enterprise computer system 292 may be implemented as enterprise computer system 150, which may include an agent system, to handle communication with multiple enterprise computer systems. In some embodiments, communication module 230 may be configured to send and receive communications through a firewall.

In certain embodiments, one or more of enterprise computer systems 282, 292 may communicate with cloud computer system 110 using one or more different protocols. A protocol may include a communication protocol, such as SPDY. A protocol may include an application protocol such as an HTTP-based protocol. In some embodiments, enterprise computer systems 282, 292 may communicate with cloud computer system 110 using a REST or SOAP communication protocols. For example, REST protocol may support a formats including URI or URL. Enterprise data formatted for communication using REST protocol may be easily converted to data formats such as JSON, comma-separated values (CSV), and really simple syndication (RSS). Enterprise computer systems 282, 292 and cloud computer system 110 may communicate using other protocols such as remote procedure calls (RPC) (e.g., XML RPC).

In some embodiments, cloud computer system 110 and enterprise computer systems 282, 292 may communicate using communication connections that support high-speed communication. Communication module 230 may maintain high-speed communication connections, which may enable cloud computer system 110 to maintain on going and multiple communications with enterprise computer systems 282, 292 for managing and/or synchronizing communication to exchange enterprise data or deliver requested services. The high-speed communication connections may afford cloud computer system 110 the ability to handle multiple communications with enterprise computer systems to fully synchronize enterprise data, whereas a mobile computing device may be limited in bandwidth of a wireless communication connection to constantly receive enterprise data. The communication connection between cloud computer system 110 and an enterprise computer system may be reliable such that cloud computer system 110 may receive and send communications to synchronize enterprise data with little or no interruption.

In some embodiments, communication module 230 may include an adaptor interface 122 configured to support communication with enterprise computer systems, some of which may support different protocols or techniques for communications. Adaptor interface 122 may include one or more adaptors, e.g., adaptor 242 or adaptor 244, each of which may be configured to communicate according to a communication protocol, a type of enterprise computer system, a type of application, a type of service, or combinations thereof. A communication protocol supported by an adaptor may be specific to one or more enterprise computer systems. For example, communication module 230 may include an adaptor 242 configured for communication with enterprise computer system 282 using a specific protocol supported by enterprise computer system 282. In another example, communication module 230 may include an adaptor 244 configured for communication with enterprise computer system 292 using a specific protocol supported by enterprise computer system 292. Adaptor interface 122 may establish separate communication connections with each of enterprise computer systems 282, 292. In some embodiments, adaptor interface 122 may be configured to communicate with an agent system, which may be included or implemented by an enterprise computer system. An adaptor in adaptor interface 122 may be configured to communicate according to a custom protocol used for communication with an agent system. The custom protocol may be specific to a type of agent system or an enterprise computer system in which an agent system supports. The adaptor interface may reduce or eliminate a need for an app, e.g., app 204 or app 214, to be developed specifically to support communication with a particular enterprise computer system.

Cloud computer system 110 may use communication module 230 to communicate with mobile computing devices, e.g., mobile computing devices 202, 212. Mobile computing devices may be situated in a different geographical location than cloud computer system 110. For example, mobile computing devices 202, 212 may be physically located beyond a firewall of cloud computer system 110 at a different geographic location (e.g., remote geographic location) than cloud computer system 110. Each of mobile computing devices 202, 212 may communicate with cloud computer system 110 using a different communication protocol. In certain embodiments, one or more of mobile computing devices 202, 212 may communicate with cloud computer system 110 using one or more different protocols. A protocol may include a communication protocol, such as SPDY. A protocol may include an application protocol such as an HTTP-based protocol. In some embodiments, communication module 230 may communicate with mobile computing devices using a custom communication protocol. The custom communication protocol may be an HTTP-based communication protocol. The communication protocol used for communication between mobile computing devices 202, 212 may support communication of enterprise data structured in different formats (e.g., JSON format), which may be easily readable by mobile computing devices 202, 212 and cloud computer system 110.

In certain embodiments, mobile computing devices 202, 212 may each implement an application (an "app") that can provide specific user interfaces to communicate with cloud computer system 110. A specific UI may be configured to communicate using a specific communication protocol. In some embodiments, specific UIs may include callable interfaces, functions, routines, methods, and/or operations that may be invoked to communicate with cloud computer system 110. Specific UIs may accept as input parameters for communicating with enterprise computer systems for enterprise data and/or to request a service. In some embodiments, communication through apps 204, 214 may be converted for communication using a custom communication protocol. In certain embodiments, specific UIs may be included or implemented by cloud computer system 110. In some embodiments, specific UIs may correspond to a custom client in an application.

Cloud computer system 110 may include one or more callable interfaces 250, e.g., an application programming interface (API). Callable interface 250 may enable an app on a mobile computing device to communicate requests to cloud service 112. Callable interface 250 may support a common or standard interface, which may allow requests including their parameters to be received from apps according to a standardized protocol, architectural style, and/or format (e.g., a REST protocol). In some embodiments, a request may be made for a service provided by one or more of enterprise computer systems 282, 292. Callable interface 250 may be configurable by a user of any one of computing devices 202, 212. Callable interface 250 may receive requests for services according to a communication protocol. For example, callable interface 250 may be a REST API that supports requests according to a REST protocol. In some embodiments, callable interface 250 may receive messages from mobile computing devices. Callable interface 250 may be configured to translate or convert messages received from mobile computing devices according to a format supported by callable interface 250. Device application developers can connect to cloud service 112 for their custom applications. In some embodiments, a callable interface 250 may be configured by the same person that develops an app, such that the person can implement a custom app to communicate with cloud service 112.

Callable interface 250 may enable enterprise computer systems to communicate with cloud service 112 according to a standardized protocol or format. Similar to application developers, those who manage enterprise computer systems can implement code (e.g., an agent system) that is configured to communicate with cloud service 112 via callable interface 250. Callable interfaces 250 may be implemented based on a type of a computing device, a type of enterprise computer systems, an app, an agent system, a service, a protocol, or other criterion. In some embodiments, callable interface 250 may support requests for services including authentication, compression, encryption, pagination with cursors, client-based throttling, non-repudiation, logging, and metrics collection. In some embodiments, callable interface 250 may be implemented for custom business-related services, such as authentication, policy enforcement, caching of responses, throttling of calls to cloud service 112, translation between asynchronous and synchronous patterns, logging of calls to underlying services, or combinations thereof. In some embodiments, callable interface 250 may enable users to load custom instructions 116 (e.g., custom code) for implementation by cloud computer system 110. The custom code may implement one or more callable interfaces 250 for cloud computer system 110, which can enable users to access custom services.

Protocol translator 252 may process a message to determine a communication protocol for a message and/or to convert a message to a communication protocol for a destination. Protocol translator 252 may convert a request received from mobile computing devices 202, 212. The request may be converted from a format of a communication protocol supported by computing device 202, 212 to a format of a communication protocol supported by enterprise computer system 282, 292. Protocol translator 252 may convert a response received from one of enterprise computer systems 282, 292. A response may be converted from a format of a communication protocol supported by enterprise computer system 282, 292 to a format of a communication protocol supported by mobile computing device 202, 212. In some embodiments, all or some of the operations performed by protocol translator 252 may be implemented in callable interface 250 and/or adaptor interface 222.

Diagnostic manager 132 may perform operations with respect to diagnostic data (e.g., diagnostic data 224). For example, diagnostic manager 132 can generate or obtain diagnostic information (e.g., diagnostic information 222) for an event that occurs in cloud computer system 110. An event may correspond to processing performed (e.g., performing a computing operation) by cloud computer system 110. For example, one event occurring in cloud computer system 110 may correspond to an operation performed during processing of a request for a service provided by an enterprise computer system.

Diagnostic manager 132 may manage and store diagnostic information (e.g., a diagnostic identifier) in local cache 220 or one or more data stores, e.g., diagnostics store 126. Diagnostic data (e.g., diagnostic data 224) used to generate the diagnostic information may be obtained from by diagnostic manager 132 from local cache 220, one or more data stores, and/or one or more external computing systems. Diagnostic data may include data about a call frame (e.g., call frame data) or stack frame (e.g., stack frame data) corresponding to one or more operations performed by cloud computer system 110. In some embodiments, diagnostic manager 132 may generate information diagnostic data used to generate diagnostic information. Examples of diagnostic information generated by diagnostic manager are described with reference to FIGS. 3-5.

Diagnostic manager 132 may determine whether diagnostic information, such as two diagnostic identifiers, is related. Identifying related diagnostic information may be useful to identify events and/or operations occurring in cloud computer system 110 that are related. For example, two events may be identified as being related based on an operation performed in a component, a package, a class, a method, a function, or combinations thereof with respect to each of the two events. Additionally or alternatively, two events may be identified as being related based on information about the operation performed with respect to each of the two events. For example, two events may be related based on a respective operation for each event being performed using a lock, encountering a wait name, executing an operation at a particular line number in a method or function, executing an operation corresponding to an operation code, an attribute related to the operation, or combinations thereof. Identification of related events and/or operations may be useful to identify common (e.g., recurring) errors, loops, problems, or issues related to processing in cloud computer system 110. Related diagnostic information may enable a user to identify a flow of operation in cloud computer system. For example, related events may correspond to diagnostic information identifying a component, a package, a method, a function, a class, or combinations thereof, in which instructions have been executed. Identification of related events may provide insight into performance during operation such that performance can be adjusted and/or optimized for execution. Related diagnostic information may be identified based on identifying diagnostic identifiers that, when compared, match. For example, two diagnostic identifiers may be compared to determine a measure of a match. The measure of a match may indicate a degree in which two diagnostic identifiers are related. Examples of various comparisons of diagnostic information are described below with reference to FIG. 4.

Diagnostic manager 132 may be implemented as one or more functional blocks or modules configured to perform various operations for generating diagnostic information. Diagnostic manager 132 may include event identifier 262, code determiner 264, diagnostic information manager 266, diagnostic information analyzer 268, identifier comparator 270, diagnostic information generator 272.

Diagnostic information manager 266 may perform one or more operations to manage storage and retrieval of diagnostic data and/or diagnostic information in cloud computer system 110. Diagnostic information manager 266 may obtain diagnostic data 224 from local storage (e.g., local cache 220), database 294, and/or one or more external computer systems (e.g., an enterprise computer system). In some embodiments, the diagnostic data received from an external computer system may correspond to processing performed by cloud computer system 110 and/or may include one or more diagnostic identifiers generated by cloud computer system. In some embodiments, diagnostic data obtained by diagnostic information manager 266 may include diagnostic information, such as a diagnostic identifier.

Diagnostic data may be generated by one or more elements of cloud computer system 110. As explained above, diagnostic data may be related to an event occurring in cloud computer system 110. The event may be related to processing performed by cloud computer system 110. The event may include, for example, the events described with reference to FIG. 1. For example, an event may be related to processing performed for a request for a service from an enterprise computer system. In another example, an event may be related to processing performed for a request to allocate a computing resource for processing of a request for one or more services provided by an enterprise computer system. In another example, an event may correspond to an error that occurs during an operation performed for processing of a request (e.g., a request for a service from an enterprise computer system).

Event identifier 262 may identify diagnostic data corresponding to an event. For example, event identifier 262 may locate diagnostic data corresponding to an event that occurs during processing of a request. In some embodiments, diagnostic data may be processed (e.g., parsed) to identify diagnostic data corresponding to an event. An event may be identified in diagnostic data based on one or more criteria, such as a type of component, a type of package, a type of class, a type of method, a type of function, a lock name, a wait name, one or more line numbers, an operation code, one or more attributes related to processing performed by cloud computer system 110, or combinations thereof. In some embodiments, an event may be identified based on one or more criteria received from a user. A criterion may include a data, a time, other information identifying an event, or combinations thereof. In some embodiments, diagnostic data correspond to an event may be located with respect to a frame, e.g., call frame or stack frame, in which an operation corresponding to an event may have occurred. A frame may be identified, for example, based on a time and/or an operation corresponding to an event. Diagnostic data may include information identifying a frame, which can be used by event detector 262 to locate diagnostic data corresponding to one or more frames.

Diagnostic information analyzer 268 may process diagnostic data to determine information included in the diagnostic data, such as information about to an event. As will be described further below, diagnostic data may include data (e.g., attribute data) corresponding to one or more attributes. The attribute data may include information (e.g., a value) for each of the attributes identified in the data. The attribute data may correspond to diagnostic data about an operation. Diagnostic information analyzer 268 may process diagnostic data, e.g., diagnostic data for a frame, to identify data corresponding to one or more attributes. The information corresponding to one or more attributes may be used by diagnostic manager 132 to generate diagnostic information (e.g., a diagnostic identifier).

Figure 3:
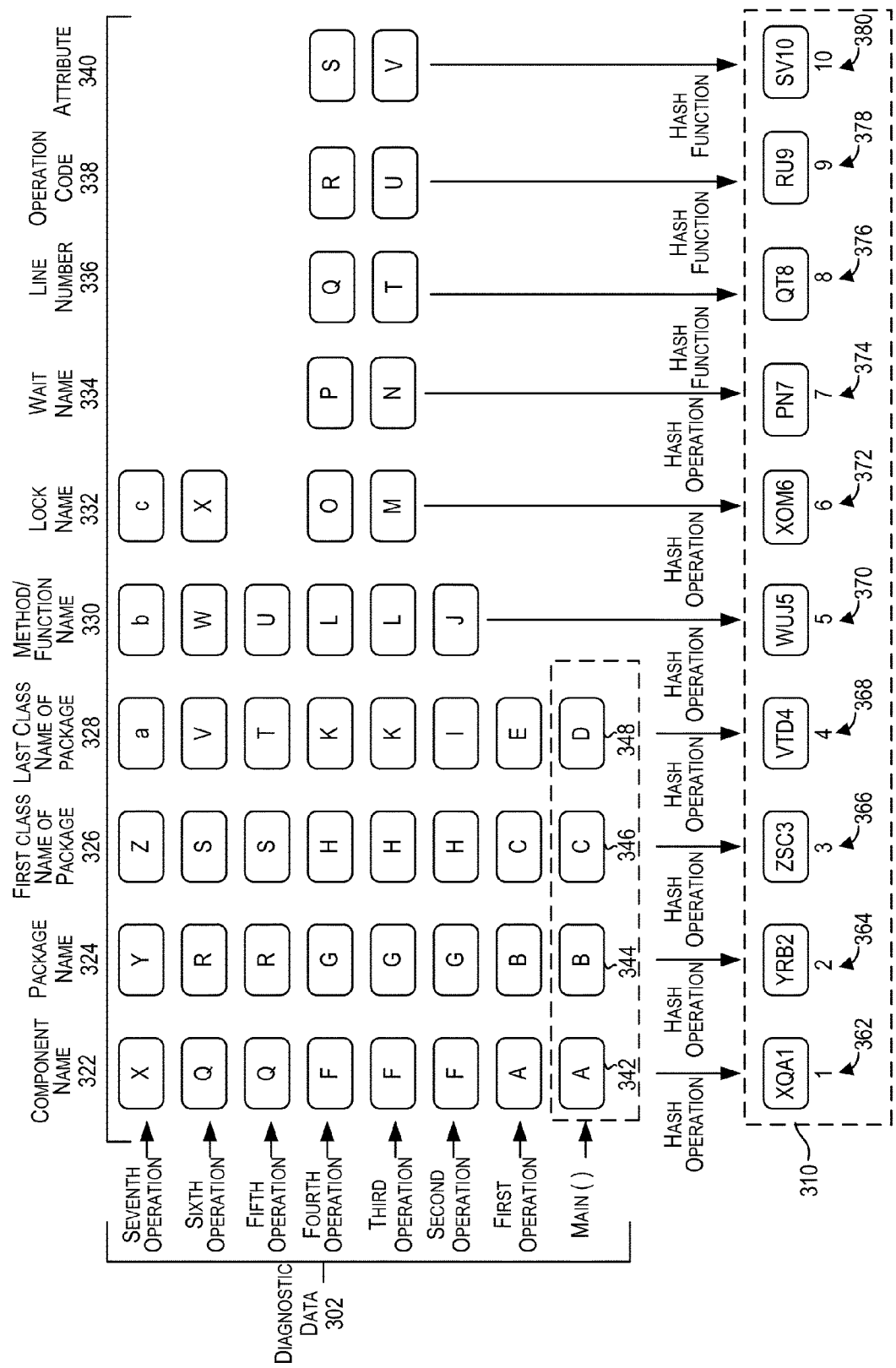
FIG. 3 illustrates an example of determining a diagnostic identifier according to some embodiments of the present invention.

Diagnostic information analyzer 268 may implement data processing techniques on diagnostic data to identify data corresponding to one or more attributes. A processing technique may include parsing diagnostic data based on a format of the diagnostic data. The format may include a known format of diagnostic data, which may enable identification of data corresponding to attributes. Further below, with reference to FIG. 3, are examples of information that can be identified in diagnostic data with respect to one or more attributes.

Code determiner 264 may determine a code based on data corresponding to one or more attributes identified in diagnostic data for an operation. As described below with reference to FIGS. 3 and 4, a code can be generated for attribute data corresponding to one or more attributes. In some embodiments, information corresponding to attribute data may include information for an attribute corresponding to multiple operations, e.g., operations performed in a call frame or a stack frame. In this example, a code can be generated based on information in attribute data corresponding to multiple operations. The code can be used to identify attribute data for one or more operations. In some embodiments, one or more codes may be generated for attribute data corresponding to an event.

Diagnostic information generator 272 may determine diagnostic information, e.g., a diagnostic identifier, based on one or more codes determined by code determiner 264. Diagnostic information generator 272 may determine a diagnostic identifier based on one or more codes generated for attribute data corresponding to an event. As described further below with reference to FIGS. 3 and 4, a diagnostic identifier can be generated by combining by combining a plurality of generated codes. In some embodiments, a diagnostic identifier can be generated by performing additional computations using a generated code corresponding to each of one or more attributes identified in the diagnostic data. A diagnostic identifier may be generated for diagnostic data corresponding to different events. For example, a diagnostic identifier may be generated for diagnostic data corresponding to a call frame or a stack frame. The diagnostic identifier can be generated using the one or more codes generates for each distinct attribute identified in the diagnostic data corresponding to the call frame or stack frame.

In some embodiments, diagnostic information manager 266 may cause one or more diagnostic identifiers to be stored with diagnostic data (e.g. a stack trace data). A diagnostic identifier may be printed or associated with diagnostic data such that the diagnostic identifier may be used to quickly identify diagnostic data corresponding to a call frame or a stack frame. For example, the diagnostic identifier may appear in a "readme" incident file. For operations that result in generation of an identical stack or call frame, the diagnostic identifier may be a fast way to identify events performing the same operations.

Identifier comparator 270 may perform a comparison between two diagnostic identifiers to determine a measure of a match between those identifiers. For the comparison, each code in one diagnostic identifier (e.g., a first diagnostic identifier) may be compared to a code in the other diagnostic identifier (e.g., a second diagnostic identifier) corresponding to one or more attributes for which the codes were generated. Identifier comparator 270 may determine a measure of a match between two identifiers. The measure of a match can indicate a ratio of matching codes or the amount of codes that match. Based on the codes that match, one can determine whether an event corresponding to each identifier are related and if so, based on the attributes corresponding to the codes that match. Examples of comparisons between identifiers are described below with reference to FIG. 4.

In some embodiments, identifier comparator 270 may keep a count of identifiers and/or one or more codes that are generated. The count may be used to determine whether a certain operation or a certain stack of operations occurs a threshold amount of times. The result may be stored with diagnostic information, which can be used to identify recurring operations.

In some embodiments, identifier comparator 270 may compare a diagnostic identifier to one or more pre-determined diagnostic identifiers. A pre-determined diagnostic identifier may correspond to one or more expected operations, or an expected frame. An expected operation may include an operation that causes an error or performance issues. The pre-determined diagnostic identifier can be used to identify other diagnostic identifiers that are similar or identical.

FIG. 3 illustrates an example of determining a diagnostic identifier, e.g., diagnostic identifier 310, according to some embodiments of the present invention. Diagnostic identifier 310 may be determined based on diagnostic data related to processing performed by a cloud service, e.g., cloud service 112. In some embodiments, the diagnostic data may correspond to processing of a request for a service provided by an enterprise computer system. Techniques described herein for determining diagnostic identifier 310 may be implemented by cloud computer system 110.

FIG. 3 illustrates diagnostic data 302 corresponding to processing performed by a cloud computer system. Diagnostic data 302 may include diagnostic data for a call frame or stack frame for processing performed by the cloud computer system. For example, data for a stack frame may include trace data (e.g. stack trace data) identifying information about processing performed in a call frame. Diagnostic data 302 may be generated by the cloud computer system, an external computing system, or a combination thereof. Diagnostic data 302 may be received from an external computing system and/or from one or more data stores, e.g., diagnostics store 126, of the cloud computer system.

Diagnostic data 302 may be located or identified in diagnostic data corresponding to multiple events occurring in the cloud computer system. For example, diagnostic data 302 may correspond to an event that occurs during processing performed by the cloud computer system. In some embodiments, diagnostic data 302 may include diagnostic data corresponding to multiple events occurring in the cloud computer system. In some embodiments, diagnostic data 302 may include data corresponding to processing performed for one or more stack frames, one or more call frames, or combinations thereof. For example, diagnostic data 302 may include information about an event occurring in the cloud computer system. In some embodiments, the information in diagnostic data 302 may correspond to a call frame or a stack frame. For example, diagnostic data 302 may include information about one or more operations (e.g., execution of a function, a method, or a routine) performed for an event.

In the example shown in FIG. 3, diagnostic data 302 may correspond to an event that occurs during processing performed by the cloud computer system. Diagnostic data 302 may correspond to a call frame or stack frame of data corresponding to the processing performed during the event. For example, diagnostic data 302 may include information corresponding to multiple operations that are performed in a call frame. An operation may correspond to an exception that occurs during execution of an operation. Starting from the bottom operation ("main function") and moving up, each operation may correspond to a different function that was called. The function may be called through an API by a different application. In some embodiments, the information in diagnostic data 302 may correspond to multiple operations. Diagnostic data 302 may include information about each operation identified in the call frame. Each operation may correspond to an instruction or an operation executed by a function. The information corresponding to each operation may be arranged according to an order of occurrence of each operation and/or a relationship with other operations. For example, one operation, e.g., main ( ), may call another operation, e.g., first operation. Each operation may be called by another operation identified by the information in diagnostic data 302. Diagnostic data 302 may further indicate, as shown in the example of FIG. 3, an order in which operations are performed for processing performed by the cloud computer system. The order may correspond to an order by which the operations are related or invoked. The information may correspond to one or more of a plurality of attributes, which is further described below.

Diagnostic data 302 may include information corresponding to one or more attributes related to processing performed by the cloud computer system. The information corresponding to each operation identified in diagnostic data 302 may include a value corresponding to one or more of a plurality of attributes. For purposes of illustration, diagnostic data 302 is described as having information corresponding to one or more of a plurality of attributes, e.g., a plurality of attributes 322, 324, 326, 328, 330, 332, 334, 336, 338, 340. In some embodiments, the plurality of attributes 322, 324, 326, 328, 330, 332, 334, 336, 338, 340 may be arranged according to a relationship between each of the plurality of attributes 322, 324, 326, 328, 330, 332, 334, 336, 338, 340. For example, the following relationships may be used to determine an order of the plurality of attributes. A component name 322 may correspond to a name of a component.

A package name 324 may correspond to a name of a package. The package may be included in or associated with a component identified by component name 322. A first class name of package 326 may correspond to a first class of a package that is invoked. A last class name of package 328 may correspond to a last class of a package that is invoked. A method/function name 330 may correspond to a method/function performed or executed in a class of a package. A lock name 332 may correspond to a name of a lock acquired in a method/function that is performed. A wait name 334 may correspond to a wait event. In some embodiments, a wait event identified by the wait name 334 may occur once with respect to a frame (e.g., a call frame or a stack frame) corresponding to diagnostic data 302. The wait event may occur as a result of an operation performed with respect to such a frame. A line number 336 may correspond to a number of a line of code executed in a method/function. A function code 338 may correspond to a function code identifying a function that is performed. An attribute 340 may correspond to an attribute related to operation.

Information in diagnostic data 302 may correspond to an order of the plurality of attributes 322, 324, 326, 328, 330, 332, 334, 336, 338, 340. The information may include a value corresponding to each attribute of the plurality of attributes 322, 324, 326, 328, 330, 332, 334, 336, 338, 340. The information in diagnostic data 302 can be arranged in an order that is different from what is shown. The information in diagnostic data 302 corresponding to an operation may corresponding to each of the plurality of attributes 322, 324, 326, 328, 330, 332, 334, 336, 338, 340.

The information in diagnostic data 302 corresponding to each of the plurality of attributes 322, 324, 326, 328, 330, 332, 334, 336, 338, 340 may indicate information about performance of an operation with respect to the attributes. In some embodiments, information corresponding to one or more of the plurality of attributes 322, 324, 326, 328, 330, 332, 334, 336, 338, 340 may be similar between operations where operations are related, e.g., the same class or the same package. A person of ordinary skill in the art will appreciate that the information in diagnostic data 302 may be arranged in other orders, each of which may correspond, for example, to a relationship of the plurality of attributes 322, 324, 326, 328, 330, 332, 334, 336, 338, 340 to an operation that is performed. In some embodiments, diagnostic data 302 may not include information corresponding to one or more of the plurality of attributes 322, 324, 326, 328, 330, 332, 334, 336, 338, 340 with respect to one or more operations. For example, the information in diagnostic data 302 corresponding to a main function may not include information corresponding to the attributes 330, 332, 334, 336, 338, 340. In this example, information in diagnostic data 302 corresponding to the main function may include information corresponding to the attributes 322, 324, 326, 328. In some embodiments, diagnostic data 302 corresponding to an operation in a frame (e.g., a call frame or a stack frame) may include data corresponding to some of the plurality of attributes 322, 324, 326, 328, 330, 332, 334, 336, 338, 340.

Diagnostic identifier 310 may be generated based on diagnostic data 302. In some embodiments, diagnostic identifier 310 may be generated based on a plurality of codes 362, 364, 366, 368, 370, 372, 374, 376, 378, 380. For example, diagnostic identifier 310 may be generated by concatenating the plurality of codes 362, 364, 366, 368, 370, 372, 374, 376, 378, 380. Plurality of codes 362, 364, 366, 368, 370, 372, 374, 376, 378, 380 may be concatenated in any order, such as the one shown in FIG. 3. In some embodiments, plurality of codes 362, 364, 366, 368, 370, 372, 374 may be concatenated according to an order based on the plurality of attributes 322, 324, 326, 328, 330, 332, 334, 336, 338, 340.

Below is an example of pseudo-code that may generate plurality of codes 362, 364, 366, 368, 370, 372, 374, 376, 378, 380 based on diagnostic data 302. In this example, a hash function may be executed to perform a hash operation on diagnostic data 302 corresponding to each of the plurality of attributes 322, 324, 326, 328, 330, 332, 334, 336, 338, 340. In the example shown in FIG. 3, each of the plurality of codes 362, 364, 366, 368, 370, 372, 374, 376, 378, 380 may be generated using one of the plurality of attributes 322, 324, 326, 328, 330, 332, 334, 336, 338, 340, respectively. A hash code structure may be used to store each of the plurality of codes 362, 364, 366, 368, 370, 372, 374, 376, 378, 380, which are generated. In some embodiments, code 372 generated from diagnostic data corresponding to lock name 332 may represent a sequence of locks acquired for operations perform in the frame corresponding to diagnostic data 302. A concatenate operation may be performed to concatenate the plurality of codes 362, 364, 366, 368, 370, 372, 374, 376, 378, 380 into diagnostic identifier 310.

In some embodiments, a code may be generated based on diagnostic data 302 corresponding to multiple attributes in the plurality of attributes 322, 324, 326, 328, 330, 332, 334, 336, 338, 340. Therefore, the amount of codes used to generate a diagnostic identifier may be less than the number of attributes. A diagnostic identifier may be generated using the codes generated from the plurality of attributes in diagnostic data 302. Multiple attributes used to generate a code may have a relationship, such that the code generated from those attributes may provide a meaningful indication of an operation. One or more codes may be generated using multiple attributes to reduce a number of codes in a diagnostic identifier. A number of codes in a diagnostic identifier may be reduced to shorten a length of the diagnostic identifier. By using codes that are generated based on multiple attributes, the diagnostic identifier generated using those codes may provide a meaningful indication of a relationship between diagnostic data 302 corresponding to those attributes or the operations when diagnostic data 302 corresponds to multiple operations.

Example Pseudo-Code

```
st = extractStacktrace(Exception);
hashCode[0] = hashFunction(st.packagePrefixSequence);
hashCode[1] = hashFunction(st.fullPackageSequence);
hashCode[2] = hashFunction(st.firstClassnameOfPackages);
hashCode[3] = hashFunction(st.lastClassnameOfPackages);
hashCode[4] = hashFunction(st.classnameSequence);
hashCode[5] = hashFunction(st.methodSequence);
hashCode[6] = hashFunction(st.lockName);
hashCode[7] = hashFunction(st.waitName);
hashCode[8] = hashFunction(st.lineNumberSequence);
hashCode[9] = hashFunction(st.opCodeAttributeSequence);
stacktraceID = concatenate(hashCode);
```

The plurality of codes 362, 364, 366, 368, 370, 372, 374, 376, 378, 380 may be generated by implementing one or more techniques for generating codes using diagnostic data 302. In one example, each code of the plurality of codes 362, 364, 366, 368, 370, 372, 374, 376, 378, 380 may be generated using a value corresponding to a different attribute of the plurality of attributes 322, 324, 326, 328, 330, 332, 334, 336, 338, 340. A code, such as any one of the plurality of codes 362, 364, 366, 368, 370, 372, 374, 376, 378, 380, may be generated by implementing a hash operation using information corresponding to one or more attributes. A code may be generated in any order and may be generated based on information corresponding to multiple attributes regardless of an order of the attributes in diagnostic data 302. For example, code 362, code 364, code 366, code 368, code 370, code 372, code 374, code 376, code 378, and code 380 may be generated for information in diagnostic data 302 corresponding to component name attribute 322, package name attribute 324, first class name of package attribute 326, last class name of package attribute 328, method/function name attribute 330, lock name attribute 332, wait name attribute 334, line number attribute 336, operation code attribute 338, and attribute 340, respectively. When diagnostic data 302 does not include information for an attribute of the plurality of attributes 322, 324, 326, 328, 330, 332, 334, 336, 338, 340, a null or a placeholder value may be specified in place of a generated code. In some embodiments, a pre-defined value may represent the code for an attribute in which no information exists in diagnostic data 302. The pre-defined value may provide an indicating that no information exists for the attribute. While the example in FIG. 3 illustrates an embodiment in which a code may be generated for each attribute identified in diagnostic data 302, other embodiments may implement techniques in which a code may be generated based on multiple attributes identified in diagnostic data 302.

In some embodiments, a code may represent a hash code determined based on performing a hash operation as described herein. In In the example shown in FIG. 3, each of the plurality of codes 362, 364, 366, 368, 370, 372, 374, 376, 378, 380 may be generated by implementing a hash operation. Other types of algorithms may be implemented to generate a code using diagnostic data 302. In some embodiments, the hash operation may be performed using the information corresponding to an attribute plus other information (e.g., other identifier).

In some embodiments, a code that is generated for information corresponding to an attribute may be generated based on information corresponding to multiple operations identified in diagnostic data 302. For example, a code generated for a component name 322 may be generated by performing a hash operation using the information corresponding to each of the operations, e.g., a main function, a first operation, a second operation, a third operation, a fourth operation, a fifth operation, a sixth operation, and a seventh operation. Similarly, a code for other attributes may be generated based on information corresponding to each of the operations identified in diagnostic data 302. A code may be generated for multiple attributes corresponding to diagnostic data 302 for multiple operations. In some embodiments where information for an attribute does not exist, a pre-defined value or no value may be used for information corresponding to other operations to generate a code.

A code that is generated implementing techniques described herein may have a particular length (e.g., a bit, a byte, or a word) corresponding to size of the code. The length of a code may be based on a size of the diagnostic data (e.g., a bit, a byte, or a word) used to generate the code. In some embodiments, the length of a code may correspond to a length of a diagnostic identifier. The length of a diagnostic identifier may be based on a storage size for diagnostic data associated with the identifier.

Analysis of diagnostic data may be performed by comparing diagnostic identifiers. As described further below with reference to FIG. 4, a diagnostic identifier may be compared to other diagnostic identifiers to determine a relationship between the identifiers if one exists. Further, a diagnostic identifier may be stored in association with diagnostic data to aid in the identification of diagnostic data, such as diagnostic data corresponding to a particular request from which a diagnostic identifier may be determined. Collectively, diagnostic identifiers may enable a person to understand a flow of operation during processing performed by the cloud computer system. In a cloud computer system, where many operations may be performed for many different events, diagnostic identifiers may be particularly useful to enable a person to identify a relationship between processing, e.g., operations that are performed. For example, diagnostic identifiers may enable a person to identify a particular operation or a frequency of a type of operation based on identification a similar or identical code in diagnostic identifiers that are being compared. For example, when an enterprise computer system is called frequently, diagnostic identifiers having one or more common codes corresponding to one or more particular attributes may aid in the identification of related processing.

Figure 4:
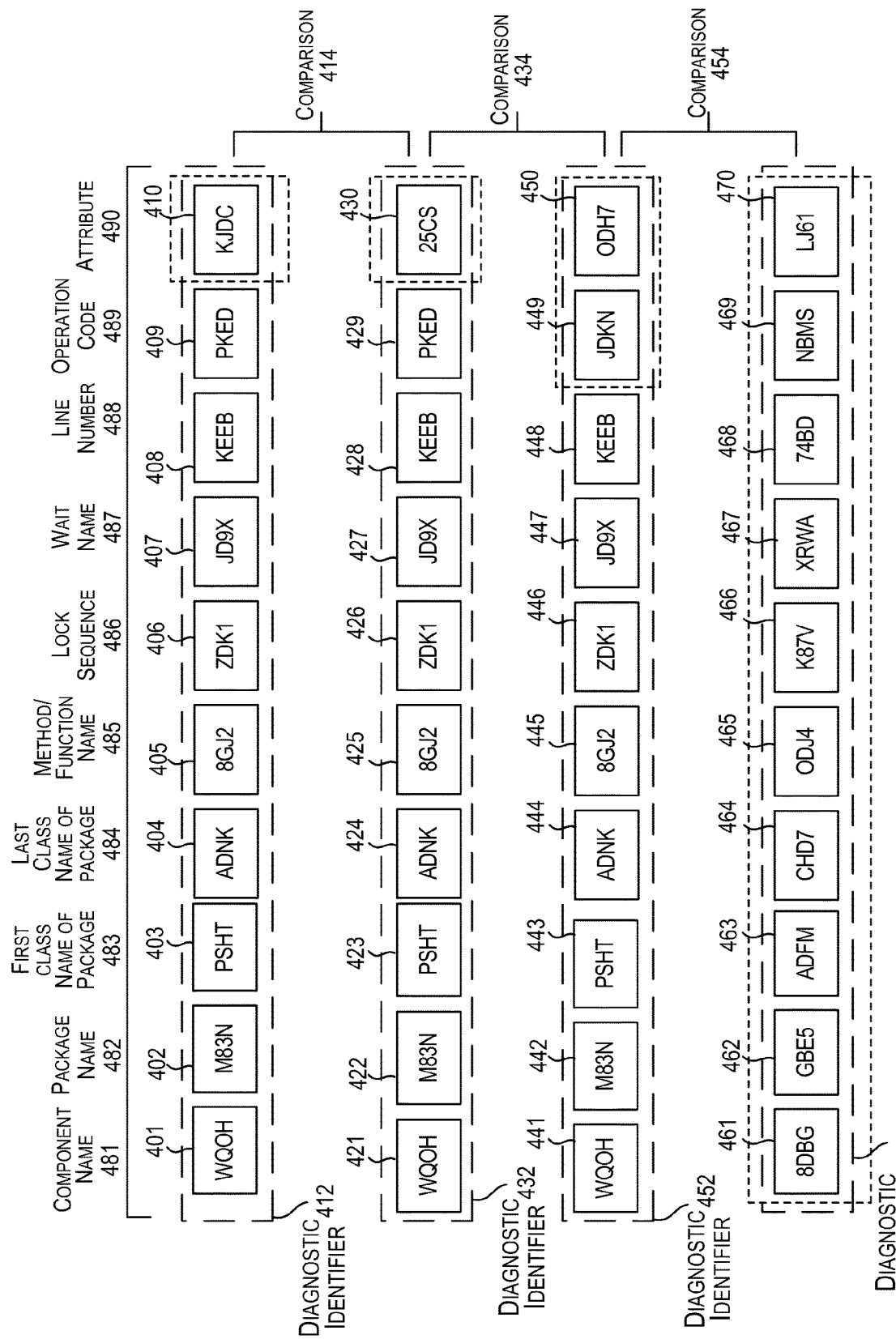
FIG. 4 illustrates an example of comparing different diagnostic identifiers according to some embodiments of the present invention.

FIG. 4 illustrates an example of comparing diagnostic identifiers according to some embodiments of the present invention. Specifically, FIG. 4 illustrates examples of comparing various diagnostic identifiers. The examples described with reference to FIG. 4 may be performed by a cloud computer system, e.g., cloud computer system 110.

Depicted in FIG. 4 are examples of diagnostic information such as a diagnostic identifier 412, a diagnostic identifier 432, a diagnostic identifier 452, and a diagnostic identifier 472. The diagnostic information may be generated by a cloud computer system, e.g., cloud computer system 110, for one or more events occurring during processing performed by the cloud computer system. A diagnostic identifier may be generated by techniques described herein. Each of diagnostic identifier 412, diagnostic identifier 432, diagnostic identifier 452, and diagnostic identifier 472 may be generated for a different event occurring during processing by a cloud computer system. In some embodiments, one or more of diagnostic identifier 412, diagnostic identifier 432, diagnostic identifier 452, and diagnostic identifier 472 may be generated based on diagnostic data in for processing occurring in a single call frame or stack frame. An order of each event occurring in the cloud computer system, each of which corresponds to a different one of diagnostic identifier 412, diagnostic identifier 432, diagnostic identifier 452, and diagnostic identifier 472, may be received and/or processed in any order by the cloud computer system. In certain embodiments, one or more of diagnostic identifiers 412, 432, 452, 472 may be generated based on stored information (e.g., stored diagnostic data).

As described above, a diagnostic identifier may be generated based on a plurality of codes, each code being generated based on diagnostic data corresponding to processing performed by a cloud computer system. As shown in FIG. 4, each of diagnostic identifier 412, diagnostic identifier 432, diagnostic identifier 452, and diagnostic identifier 472 may include a plurality of codes. To illustrate, diagnostic identifier 412 may include codes 401, 402, 403, 404, 405, 406, 407, 408, 409, 410 based on which diagnostic identifier 412 may be generated. Each code may be generated based on an operation performed using attribute data corresponding to a different attribute of a plurality of attributes 481, 482, 483, 484, 485, 486, 487, 488, 489, 490 identified in an operation performed by a cloud computer system.

In the examples shown in FIG. 4, a comparison may be performed between any two diagnostic identifiers according to a manner, such as one described herein. Comparing one diagnostic identifier (e.g., a first diagnostic identifier) to another diagnostic identifier (e.g., a second diagnostic identifier) may include comparing each code of the plurality of codes in the first diagnostic identifier to a corresponding code of a plurality of codes in the second diagnostic identifier with respect to a similar attribute. When performing a comparison of a code from one identifier to a code in another identifier, the comparison may be performed quantitatively. In some embodiments, a degree of difference between two identifiers may be based on the codes that do not match.

FIG. 4 shows an example of a comparison 414 between diagnostic identifier 412 and diagnostic identifier 432. Code 401, code 402, code 403, code 404, code 405, code 406, code 408, code 409, and code 410 in diagnostic identifier 412 may correspond to a component name attribute 481, a package name attribute 482, a first class name of package attribute 483, a last class name of package attribute 484, a method/function name attribute 485, a lock sequence attribute 486, a wait name attribute 487, a line number attribute 488, an operation code attribute 489, and attribute 490, respectively. A lock sequence attribute may indicate data corresponding to a sequence of locks acquired in a frame. Code 421, code 422, code 423, code, 424, code 425, code 426, code 427, code 428, code 429, and code 430 in diagnostic identifier 432 may correspond to component name attribute 481, package name attribute 482, first class name of package attribute 483, last class name of package attribute 484, method/function name attribute 485, lock sequence attribute 486, wait name attribute 487, line number attribute 488, operation code attribute 489, and attribute 490, respectively. For comparison 414, each of the plurality of codes 401-410 may be compared to a corresponding code of the plurality of codes 421-430 with respect to one or more similar attributes that are used to generate the codes being compared. In particular, comparison of code 410 to code 430 with respect to an attribute 490 may indicate that code 410 does not match code 430. Therefore, a difference exists between diagnostic identifier 412 and diagnostic identifier 432. In this example, a difference between diagnostic identifier 412 and diagnostic identifier 432 may be considered a minor difference, because the difference is based on a difference in an attribute corresponding to each of diagnostic identifier 412 and diagnostic identifier 432. In some embodiments, a greater difference may exist between two diagnostic identifiers for differences identified by a comparison of codes, such as codes located towards the leftmost code in the two identifiers are compared. In such embodiments, a lesser difference may exist between two diagnostic identifiers for differences identified by a comparison of codes, such as codes located towards the rightmost code in the two identifiers are compared. In some embodiments, such differences may be identified in a different manner based on an arrangement of the attributes corresponding to the codes in a diagnostic identifier.

FIG. 4 shows an example of a comparison 434 between diagnostic identifier 432 and diagnostic identifier 452. Code 441, code 442, code 443, code, 444, code 445, code 446, code 447, code 448, code 449, and code 450 in diagnostic identifier 452 may correspond to component name attribute 481, package name attribute 482, first class name of package attribute 483, last class name of package attribute 484, method/function name attribute 485, lock sequence attribute 486, wait name attribute 487, line number attribute 488, operation code attribute 489, and attribute 490, respectively. For comparison 434, each of the plurality of codes 421-430 may be compared to a corresponding code of the plurality of codes 441-450 with respect to a similar attribute. In particular, comparison of code 449 to code 429 with respect to operation code attribute 489 and comparison of code 450 to code 430 with respect to attribute 490 indicates that diagnostic identifier 452 does not match diagnostic identifier 432.

FIG. 4 shows an example of a comparison 434 between diagnostic identifier 452 and diagnostic identifier 472. Code 461, code 462, code 463, code, 464, code 465, code 466, code 467, code 468, code 469, and code 470 in diagnostic identifier 452 may correspond to component name attribute 481, package name attribute 482, first class name of package attribute 483, last class name of package attribute 484, method/function name attribute 485, lock sequence attribute 486, wait name attribute 487, line number attribute 488, operation code attribute 489, and attribute 490, respectively. For comparison 454, each of the plurality of codes 441-450 may be compared to a corresponding code of the plurality of codes 461-470 with respect to a similar attribute. In this example, none of the plurality of codes 441-450 matches a corresponding code of the plurality of codes 461-470 with respect to a similar attribute.

A result may be determined based on performing a comparison. In some embodiments, the result may indicate a measure of a match or a relationship between the two diagnostic identifiers that are analyzed for the comparison. A result may be determined based on a value computed using one or more techniques described herein. The value may indicate a measure of a match between two diagnostic identifiers. In some embodiments, the measure of a match between two identifiers may be greater corresponding to a greater value indicating the measure of the match.

In some embodiments, a value indicating a measure of a match between two identifiers may be computed using a ratio of generated codes that match based on comparing one diagnostic identifier to another diagnostic identifier. For example, the value indicating a measure of a match for comparison 414 may be computed as ninety percent, indicating a ratio of generated codes that match (e.g., nine out of ten codes) based on comparing diagnostic identifier 412 to another diagnostic identifier 432. In another example, the value indicating a measure of a match for comparison 434 may be computed as eighty percent, indicating a ratio of generated codes that match (e.g., eight out of ten codes) based on comparing diagnostic identifier 432 to another diagnostic identifier 452. In yet another example, the value indicating a measure of a match for comparison 454 may be computed as zero percent, indicating a ratio of generated codes that match (e.g., zero out of seven codes) based on comparing diagnostic identifier 452 to another diagnostic identifier 472. The value indicating the measure of a match for a comparison may indicate an empirical relationship between two identifiers that are compared. The empirical relationship may be used to determine whether an event corresponding to each identifier is related based on one or more of their attributes. For example, two identifiers that match based on their respective code corresponding to a component name, a package name, a class name of the package, a method name, and an operation code may be related based on their operations.

In some embodiments, a value indicating a measure of a match may be computed based on an amount of the plurality of generated codes that match based on comparing one diagnostic identifier to another second diagnostic identifier. For example, the value indicating a measure of a match for comparison 414 may be computed as nine corresponding to the amount of the plurality of generated codes that match between each of diagnostic identifier 412 and diagnostic identifier 432.

The result of a comparison between two diagnostic identifiers may be compared to a comparison threshold. A determination may be made whether two diagnostic identifiers match based on satisfaction of a comparison threshold. The result may include the value indicating a measure of a match between two diagnostic identifiers may be compared to a comparison threshold. The result may include the amount of the plurality of generated codes that match based on a comparison of two diagnostic identifiers. The comparison threshold may be pre-determined based on determining attributes of a diagnostic identifier to be considered for the comparison threshold. The comparison threshold can be defined based on a technique used to compute the value. For example, the comparison threshold may be a particular ratio (e.g., fifty percent) when the value is computed as a ratio of generated codes that match based on a comparing one diagnostic identifier to another diagnostic identifier.

Figure 5:
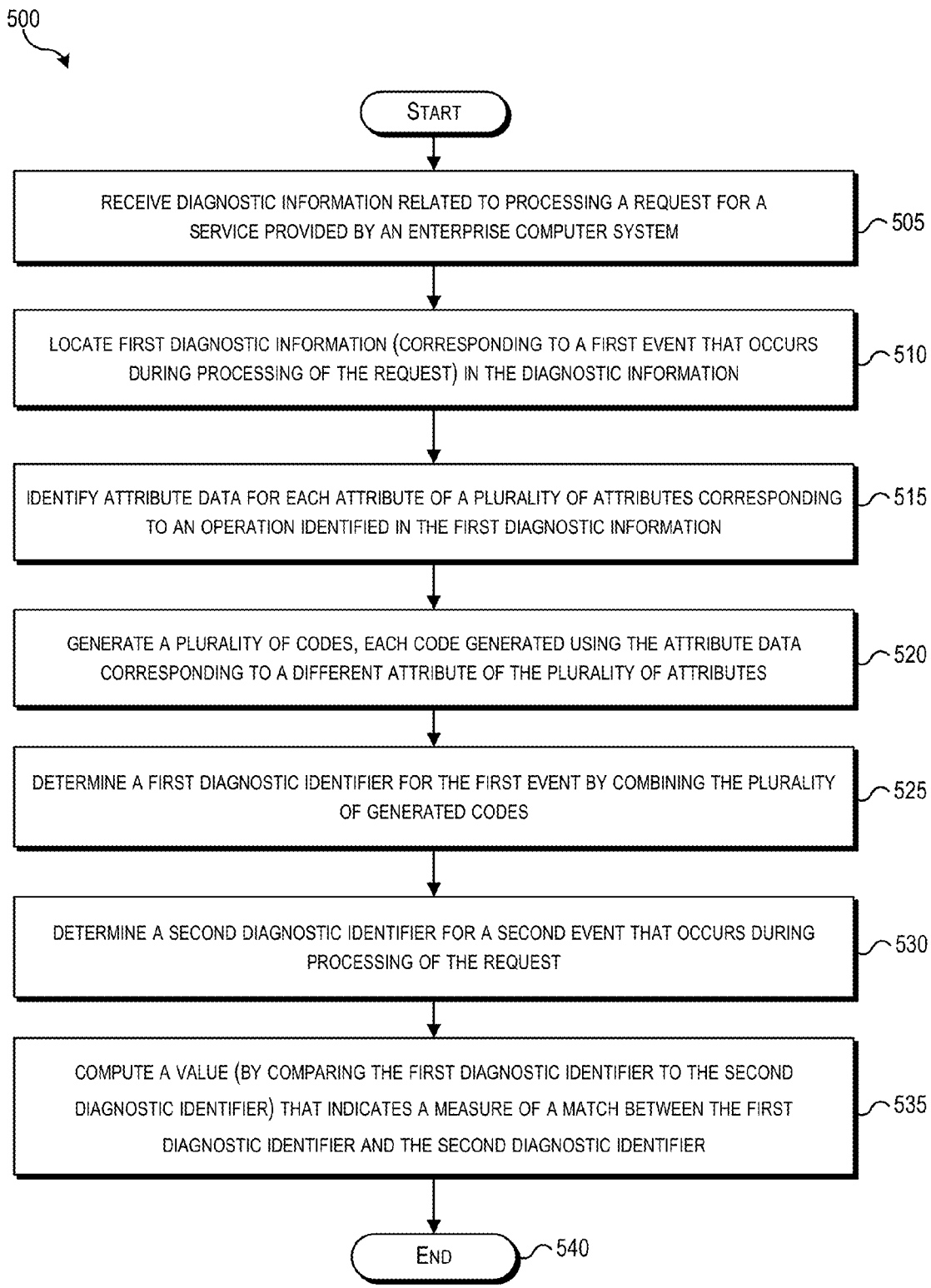
FIG. 5 is a flowchart illustrating a process for determining diagnostic information according to some embodiments of the present invention.

FIG. 5 shows a flowchart illustrating a process 500 for determining diagnostic information according to some embodiments of the present invention. Specifically, process 500 can enable a cloud computer system to determine diagnostic information related to processing a request for a service provided by an enterprise computer system. In some embodiments, diagnostic information may be determined for any type of event that may occur during processing performed by a cloud computer system (e.g., cloud computer system 110) for a cloud service (e.g., cloud service 112). For example, diagnostic information may be determined for an event that occurs during processing of a request for a service provided by an enterprise computer system.

In some embodiments, a diagnostic identifier may be compared to other diagnostic identifiers to determine a measure of a matching between two identifiers. The measure of match between two identifiers may be useful to enable a user (e.g., an administrator) identify related diagnostic information (e.g., diagnostic identifiers). The related diagnostic information may enable identification of a relationship between events that have occurred in the cloud computer system. The relationship may correspond to processing performed by a cloud computer system for similar or identical requests. The relationship may further enable a user to identify or trace a flow of operations executed during processing of related requests. In certain embodiments, a cloud computer system (e.g., cloud computer system 110) may implement process 500.

Process 500 is illustrated as a logical flow diagram, the operation of which represents operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, applications, objects, components, data structures, and the like that perform particular functions or implement particular data types. The order in which the operations are described is not intended to be construed as a limitation, and any number of the described operations may be combined in any order and/or in parallel to implement the processes.

Beginning at block 505, process 500 may include receiving diagnostic data related to processing a request for a service provided by an enterprise computer system. The request may be one that is processed by a computer system that implements the process 100. The diagnostic data may be received immediately after the diagnostic data is generated or some other time after the diagnostic data has been generated. In some embodiments, the diagnostic data may be received from a data store (e.g. diagnostics data store 126) or an external computer system (e.g., an enterprise computer system), where the diagnostic data may have been previously generated. In some embodiments, the diagnostic data may be received as it is generated during processing performed by cloud computer system 110.

At block 510, process 500 may include locating diagnostic data, e.g., first diagnostic data, in the diagnostic data. Diagnostic data may be located based on a type of diagnostic data (e.g., stack trace data) corresponding to an event, e.g., a first event, identified in the diagnostic data. For example, the first diagnostic data may be located corresponding to an event (e.g., an error event), which may have occurred during processing of a request for a service. The diagnostic data corresponding to the event may be identified based on or corresponding to a call frame in the diagnostic data. In some embodiments, a call frame may correspond to one or more operations performed by a computer system. The call frame may be associated with an event that occurs during the operation.

At block 515, process 500 may include identifying, by the computer system, attribute data for each attribute of a plurality of attributes corresponding to an operation identified in the diagnostic data. For example, plurality of attributes 322, 324, 326, 328, 330, 332, 334, 336, 338, 340 may correspond to an operation identified in the diagnostic data (e.g., the diagnostic data located at block 510). The attribute data may be identified in diagnostic data corresponding to a call frame. For example, the attribute data may identify an executed function and operation information about the operation. The attribute data may be identified in the diagnostic data by parsing the diagnostic data based on one or more attributes, which may be known in the diagnostic data. The diagnostic data may be parsed based on a type of the diagnostic data. One or more attributes may be identified based on the type of diagnostic data. In some embodiments, the diagnostic data may include information indicating the attribute data corresponding to each attribute of a plurality of attributes in the diagnostic data.

At block 520, process 500 may include generating a plurality of codes. For example, process 500 may include generating a plurality of codes, such as plurality of codes 312-330 of FIG. 3. Each code of the plurality of codes may be generated using the attribute data corresponding to one or more different attributes of the plurality of attributes. For example, each code of the plurality of codes 362, 364, 366, 368, 370, 372, 374, 376, 378, 380 may be generated by performing a hash operation using a value in the diagnostic data corresponding to a different attribute of the plurality of attributes 322, 324, 326, 328, 330, 332, 334, 336, 338, 340. The attribute data corresponding to an attribute of the plurality of attributes may correspond to an attribute in a call frame (e.g., call frame 302) of diagnostic.

At block 525, process 500 may include determining a diagnostic identifier (e.g., a first diagnostic identifier) for an event (e.g., an event corresponding to the diagnostic data located at block 510) by combining the plurality of generated codes. For example, diagnostic identifier 310 may be generated by combining (e.g., concatenating) each of the plurality of codes 362, 364, 366, 368, 370, 372, 374, 376, 378, 380 together.

At block 530, process 500 may include determining another diagnostic identifier (e.g., a second diagnostic identifier) for an event (e.g., a second event that is different from the first event) that occurs during processing of the request. The second diagnostic identifier may be determined based on diagnostic data (e.g., second diagnostic data that is different from the first diagnostic data located at block 510). The second diagnostic data may correspond to the second event. The second diagnostic data used to determine the second diagnostic identifier may be located by implement techniques similar to those implemented at block 510. A plurality of codes may be generated based on attribute data identified in the second diagnostic data. The attribute data may be identified in the second diagnostic data by implementing techniques such as those implemented at block 515. The plurality of codes generated for the second diagnostic data may be generated by implementing techniques such as those implemented at block 520. The second diagnostic identifier may be generated based on the plurality of codes by implementing techniques such as those implemented at block 525.

At block 535, process 500 may include computing a value that indicates a measure of a match between one diagnostic identifier (e.g., a first diagnostic identifier) and another diagnostic identifier (e.g., a second diagnostic identifier). The value may be computed by comparing a first diagnostic identifier to the second diagnostic identifier.

In some embodiments, two diagnostic identifiers may be compared with each other by implementing techniques including those described with reference to FIG. 4. For example, where a diagnostic identifier is based on a concatenation of a plurality of codes, each code of the plurality of codes in one diagnostic identifier (e.g., the first diagnostic identifier) may be compared to a corresponding code of a plurality of codes in another diagnostic identifier (e.g., the second diagnostic identifier) with respect to a similar attribute. In some embodiments, a value (indicating a measure of a match) may be computed using a ratio of generated codes that match based on comparing the first diagnostic identifier to the second diagnostic identifier. The description corresponding to FIG. 4 provides an example of determining a ratio of generated codes that match. In some embodiments, a value (indicating a measure of a match) may be computed based on an amount of the plurality of generated codes that match based on comparing the first diagnostic identifier to the second diagnostic identifier. The amount of the plurality of generated codes that match may be compared to a threshold to determine whether an event corresponding to the first diagnostic identifier is related to an event corresponding to the second diagnostic identifier are related. Process 500 may end at block 540.

It will be appreciated that process 500 is illustrative and that variations and modifications are possible. Steps described as sequential may be executed in parallel, order of steps may be varied, and steps may be modified, combined, added or omitted. In certain embodiments, process 500 may be implemented when enterprise data is received via a wireless communication connection to a network. For example, process 500 may be performed to generate two diagnostic identifiers, one corresponding to each stack call frame identified in diagnostic data. In some embodiments, the diagnostic data corresponding to each stack call frame may be processed concurrently depending on whether the diagnostic data exists for the stack call frame. As such, each diagnostic identifier may be generated concurrently and then compared with at least one diagnostic identifier.

Figure 6:
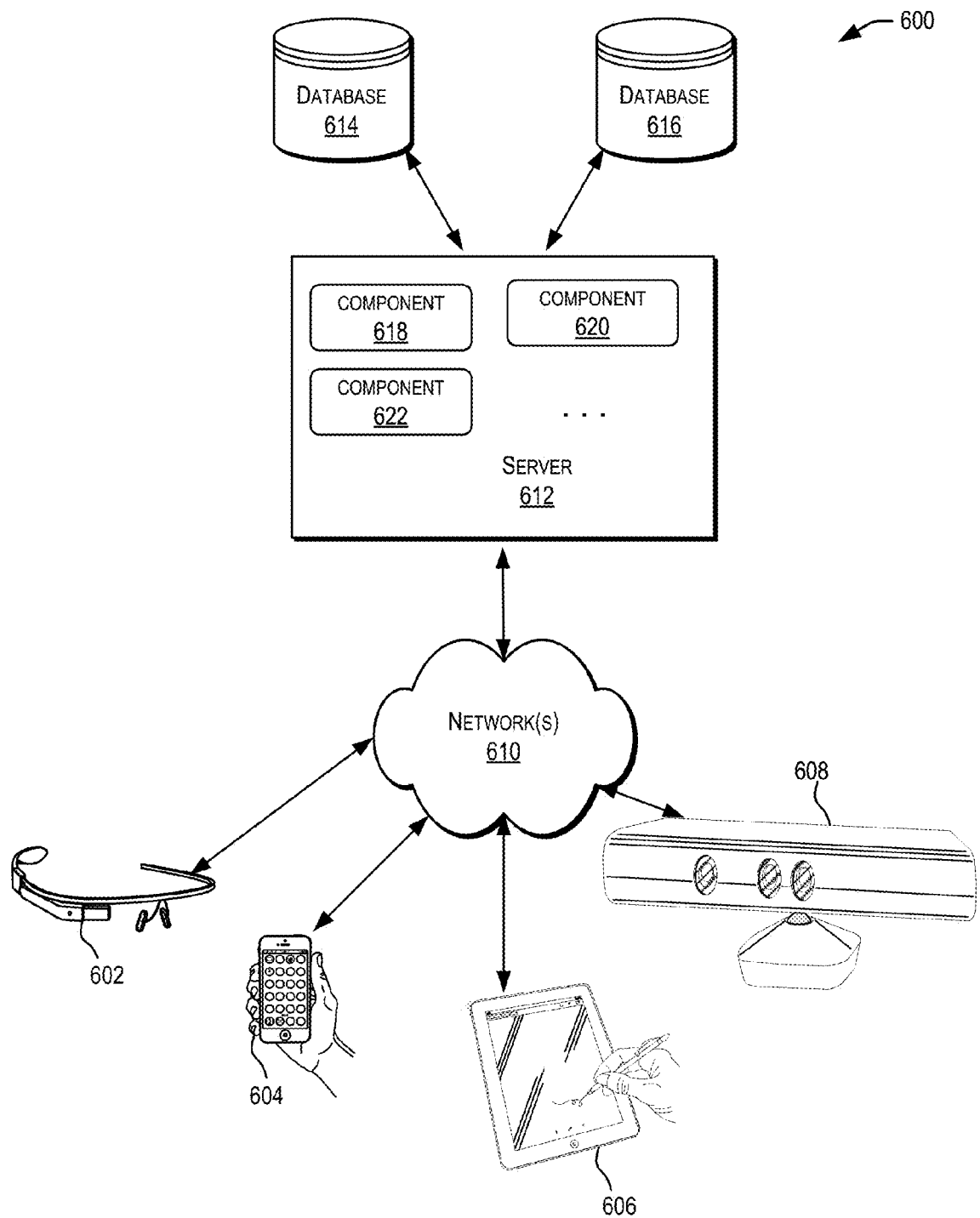
FIG. 6 depicts a simplified diagram of a distributed system for implementing one of the embodiments.

FIG. 6 depicts a simplified diagram of a distributed system 600 for implementing one of the embodiments. The distributed system 600 can implement all or some elements of computing environment 100, all or some elements of computer environment 200, computing device 302, or a combination thereof. The distributed system 600 can implement operations, methods, and/or processes (e.g., process 500 of FIG. 5). In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. In certain embodiments, the one or more client computing devices 602-608 can include or implement cloud computer system 110 of FIG. 1 or computing device 102. Server 612 may be communicatively coupled with remote client computing devices 602, 604, 606, and 608 via network 610. The server 612 can include computing device 102 or cloud computer system 110.

In various embodiments, server 612 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in the figure, the software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in the figure is thus one example of a distributed system for implementing an embodiment system and is not intended to be limiting.

Client computing devices 602, 604, 606, and/or 608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 602, 604, 606, and 608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 610.

Although exemplary distributed system 600 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), such as one based on Ethernet, Token-Ring and/or the like. Network(s) 610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 612 may be composed of one or more general purpose computers, specialized server computers (including, by way of example, PC (personal computer) servers, UNIXO servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization. One or more flexible pools of logical storage devices can be virtualized to maintain virtual storage devices for the server. Virtual networks can be controlled by server 612 using software defined networking. In various embodiments, server 612 may be adapted to run one or more services or software applications described in the foregoing disclosure. For example, server 612 may correspond to a server for performing processing described above according to an embodiment of the present invention.

Server 612 may run an operating system including any of those discussed above, as well as any commercially available server operating system. Server 612 may also run any of a variety of additional server applications and/or mid-tier applications, including HTTP servers, FTP servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands. The one or more databases 614 and 616 can include database 294 or can be implemented using support data store 130, data repository 124, diagnostics data store 126, analytics data store 128, or combinations thereof.

Figure 7:
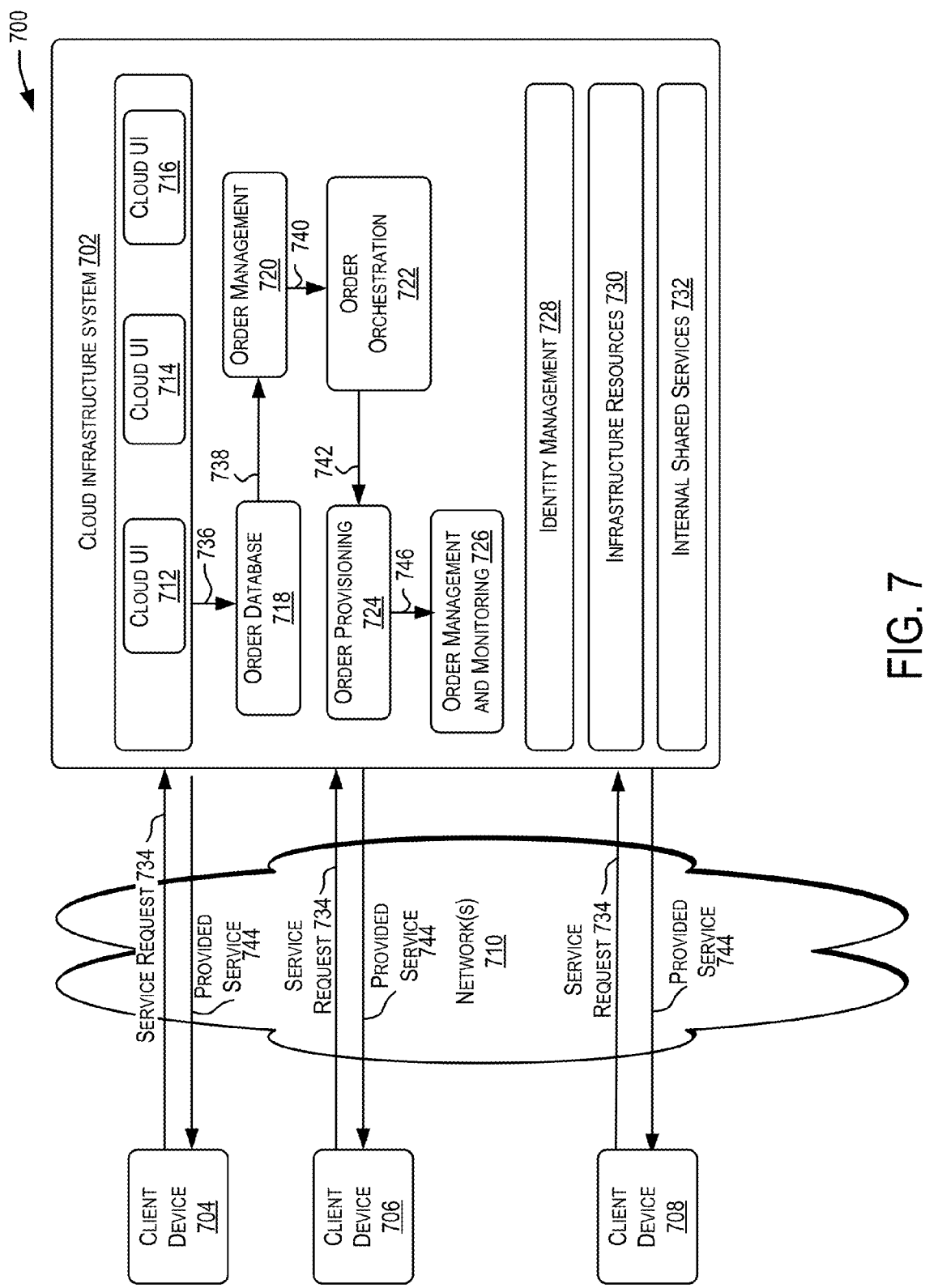
FIG. 7 shows a simplified block diagram of components of a system environment by which services provided by the components of an embodiment system may be offered as cloud services, in accordance with an embodiment of the present disclosure.

FIG. 7 is a simplified block diagram of one or more components of a system environment 700 by which services provided by one or more components of an embodiment system may be offered as cloud services, in accordance with an embodiment of the present invention. The system environment 700 can include or implement all or some elements of computing environment 100, all or some elements of computer environment 200, or a combination thereof. The system environment 700 can implement operations, methods, and/or processes (e.g., process 500 of FIG. 5). In the illustrated embodiment, system environment 700 includes one or more client computing devices 704, 706, and 708 that may be used by users to interact with a cloud infrastructure system 702 that provides cloud services. The client computing devices may be configured to operate a client application such as a web browser, a proprietary client application (e.g., Oracle Forms), or some other application, which may be used by a user of the client computing device to interact with cloud infrastructure system 702 to use services provided by cloud infrastructure system 702.

It should be appreciated that cloud infrastructure system 702 depicted in the figure may have other components than those depicted. Further, the embodiment shown in the figure is only one example of a cloud infrastructure system that may incorporate an embodiment of the invention. For example, the cloud infrastructure system 702 can include or implement all or part of cloud computer system 110. In some other embodiments, cloud infrastructure system 702 may have more or fewer components than shown in the figure, may combine two or more components, or may have a different configuration or arrangement of components.

Client computing devices 704, 706, and 708 may be devices similar to those described above for client computing devices 702, 704, 706, and 708.

Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 710.

Cloud infrastructure system 702 may comprise one or more computers and/or servers that may include those described above for server 712.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysis and researchers to visualize large amounts of data, detect trends, and/or otherwise interact with the data. Tens, hundreds, or thousands of processors linked in parallel can act upon such data in order to present it or simulate external forces on the data or what it represents. These data sets can involve enterprise data, structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and can control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform.

In some embodiments, resources in cloud infrastructure system 702 may be shared by multiple users and dynamically re-allocated per demand. Additionally, resources may be allocated to users in different time zones. For example, cloud infrastructure system 730 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 and by the services provided by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in the figure, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In exemplary operation 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI), cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to.

After an order has been placed by the customer, the order information is received via the cloud UIs, 712, 714 and/or 716.

At operation 736, the order is stored in order database 718. Order database 718 can be one of several databases operated by cloud infrastructure system 718 and operated in conjunction with other system elements.

At operation 738, the order information is forwarded to an order management module 720. In some instances, order management module 720 may be configured to perform billing and accounting functions related to the order, such as verifying the order, and upon verification, booking the order.

At operation 740, information regarding the order is communicated to an order orchestration module 722. Order orchestration module 722 may utilize the order information to orchestrate the provisioning of services and resources for the order placed by the customer. In some instances, order orchestration module 722 may orchestrate the provisioning of resources to support the subscribed services using the services of order provisioning module 724.

In certain embodiments, order orchestration module 722 enables the management of business processes associated with each order and applies business logic to determine whether an order should proceed to provisioning. At operation 742, upon receiving an order for a new subscription, order orchestration module 722 sends a request to order provisioning module 724 to allocate resources and configure those resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. Order orchestration module 722 may thus be isolated from implementation details, such as whether or not services and resources are actually provisioned on the fly or pre-provisioned and only allocated/assigned upon request.

At operation 744, once the services and resources are provisioned, a notification of the provided service may be sent to customers on client devices 704, 706 and/or 708 by order provisioning module 724 of cloud infrastructure system 702.

At operation 746, the customer's subscription order may be managed and tracked by an order management and monitoring module 726. In some instances, order management and monitoring module 726 may be configured to collect usage statistics for the services in the subscription order, such as the amount of storage used, the amount data transferred, the number of users, and the amount of system up time and system down time.

In certain embodiments, cloud infrastructure system 700 may include an identity management module 728. Identity management module 728 may be configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.). Identity management module 728 may also include the management of descriptive information about each customer and about how and by whom that descriptive information can be accessed and modified.

Figure 8:
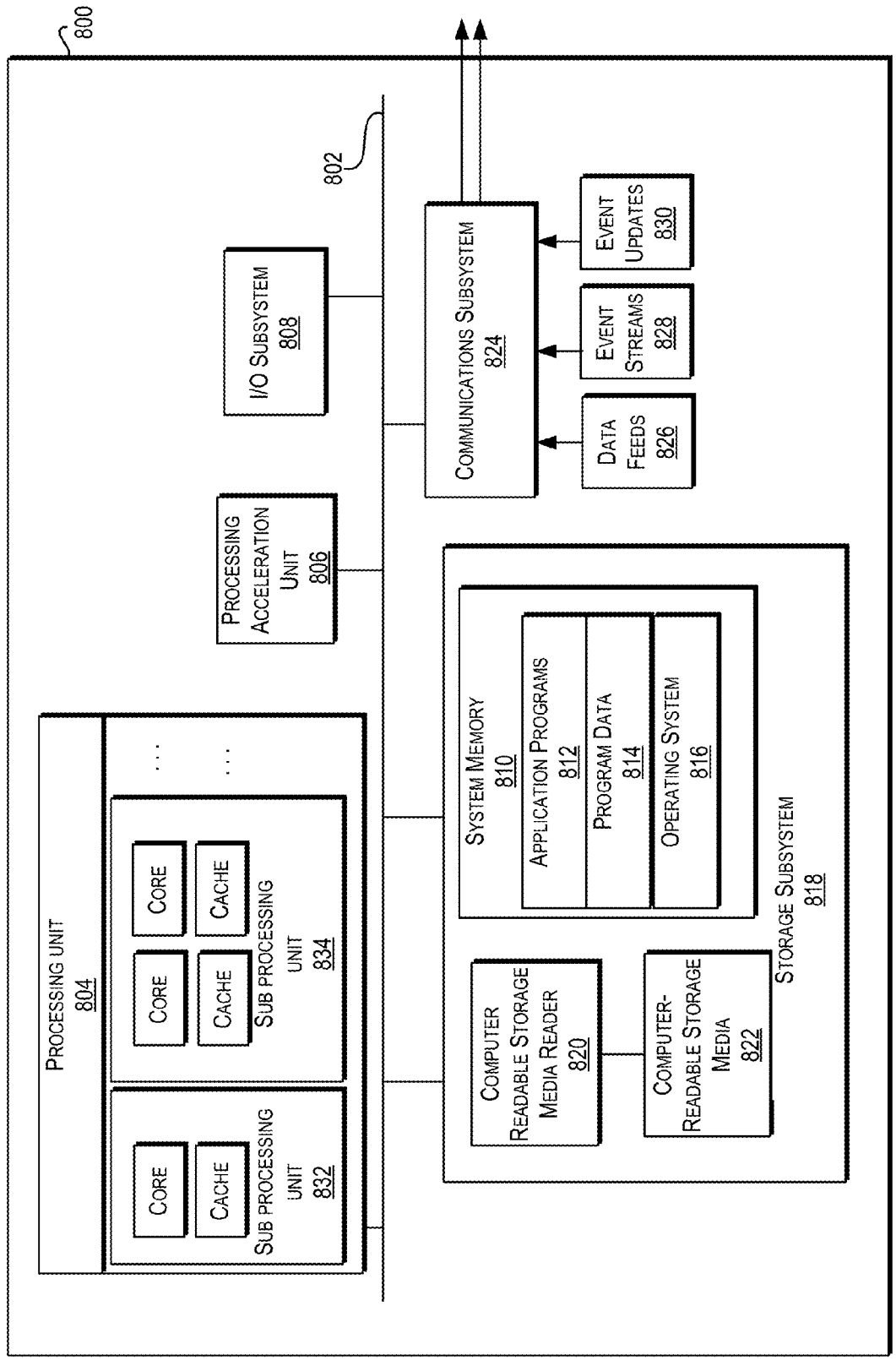
FIG. 8 illustrates an exemplary computer system, in which various embodiments of the present invention may be implemented.

FIG. 8 illustrates an exemplary computer system 800, in which various embodiments of the present invention may be implemented. The system 800 may be used to implement any of the computer systems described above. For example, all or some elements of computing environment 100, all or some elements of computer environment 200, or combinations thereof can be included or implemented in the system 800. The system 800 can implement operations, methods, and/or processes (e.g., process 500 of FIG. 5). As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present invention.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, embodiments of the invention are described with reference to specific embodiments thereof, but those skilled in the art will recognize that the invention is not limited thereto. Various features and embodiments of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   receiving, by a computer system, diagnostic data related to processing a request for a service provided by an enterprise computer system, wherein the request is processed by the computer system;
   locating, by the computer system, first diagnostic data in the diagnostic data, wherein the first diagnostic data corresponds to a first event that occurs during processing of the request;
   identifying, by the computer system, attribute data for each attribute of a plurality of attributes corresponding to an operation identified in the first diagnostic data, wherein the attribute data identifies an executed function and operation information about the operation;
   generating, by the computer system, a plurality of codes, wherein each code of the plurality of codes is generated using the attribute data corresponding to a different attribute of the plurality of attributes;
   determining, by the computer system, a first diagnostic identifier for the first event by combining the plurality of generated codes;
   determining, by the computer system, a second diagnostic identifier for a second event that occurs during processing of the request, wherein the second diagnostic identifier is determined based on second diagnostic data in the diagnostic data corresponding to the second event; and
   computing, by the computer system, a value that indicates a measure of a match between the first diagnostic identifier and the second diagnostic identifier, wherein the value is computed by comparing the first diagnostic identifier to the second diagnostic identifier.

2. The method of claim 1, wherein the computer system is a cloud computer system that is located at a first geographical location, and wherein the enterprise computer system is located at a second geographical location that is different from the first geographical location of the computer system.

3. The method of claim 1, wherein the diagnostic data includes stack trace data about one or more events, and wherein the first diagnostic data corresponds to a first call frame for the first event in the stack trace data, and wherein the second diagnostic data corresponds to a second call frame for the second event in the stack trace data.

4. The method of claim 1, further comprising:
receiving, from a mobile computing device, a request to allocate a computing resource for processing of a request for one or more services provided by the enterprise computer system;
allocating the computing resource in the computer system, wherein processing for the request for the service is performed using the allocated computing resource; and
detecting the first event during the processing of the request for the service.

5. The method of claim 1, wherein the first event corresponds to an error event that occurs during the operation identified in the first diagnostic data.

6. The method of claim 1, wherein the attribute data further identifies class information for a class used by the executed function, package information for a package including the class, and component information for a component including the package.

7. The method of claim 1, wherein the operation information about the operation identifies an operation code identifying the operation and a line number in the executed function.

8. The method of claim 1, wherein each code of the plurality of codes is generated using a hash operation.

9. The method of claim 1, wherein the attribute data includes first attribute data, the first attribute data corresponding to a first attribute of the plurality of attributes, and wherein the first attribute data includes a value for the first attribute corresponding to the operation identified in first diagnostic data.

10. The method of claim 9, wherein generating the code using the first attribute data includes performing a hash operation using the value in the first attribute data.

11. The method of claim 1, further comprising:
determining that the first diagnostic data is related to the second diagnostic data when the computed value satisfies a comparison threshold.

12. The method of claim 1, wherein comparing the first diagnostic identifier to the second diagnostic identifier includes comparing each generated code of the plurality of codes combined for determining the first diagnostic identifier to a corresponding generated code in the second diagnostic identifier.

13. The method of claim 12, wherein the value indicating the measure of the match is computed using a ratio of generated codes that match based on comparing the first diagnostic identifier to the second diagnostic identifier.

14. The method of claim 12, wherein the value indicating the measure of the match is computed based on an amount of the plurality of generated codes that match based on comparing the first diagnostic identifier to the second diagnostic identifier.

15. A computer system comprising:
one or more processors; and
one or more memory devices coupled to the one or more processors, the one or more memory devices containing instructions that, when executed on the one or more processors, cause the one or more processors to:
receive, from a mobile computing device using a first communication protocol, a request for a service, wherein the service is provided by an enterprise computer system;
convert the request for the service, wherein the request is converted to be sent to the enterprise computer system, and wherein the request is converted from a first format of the first communication protocol to a second format of a second communication protocol;
receive diagnostic data from a diagnostics data store, wherein the diagnostic data is related to processing the request to be sent to the enterprise computer system;
locate first diagnostic data in the diagnostic data, wherein the first diagnostic data corresponds to a first event that occurs during processing of the request;
identify attribute data for each attribute of a plurality of attributes corresponding to an operation identified in the first diagnostic data, wherein the attribute data identifies an executed function and operation information about the operation;
generate a plurality of codes, wherein each code of the plurality of codes is generated using the attribute data corresponding to a different attribute of the plurality of attributes;
determine a first diagnostic identifier for the first event by combining the plurality of generated codes;
determine a second diagnostic identifier for a second event that occurs during processing of the request, wherein the second diagnostic identifier is determined based on second diagnostic data in the diagnostic data corresponding to the second event; and
compute a value that indicates a measure of a match between the first diagnostic identifier and the second diagnostic identifier, wherein the value is computed by comparing the first diagnostic identifier to the second diagnostic identifier.

16. The computer system of claim 15, wherein the diagnostic data includes a stack trace data about one or more events, wherein the first diagnostic data corresponds to a first call frame for the first event in the stack trace data, and wherein the second diagnostic data corresponds to a second call frame for the second event in the stack trace data.

17. The computer system of claim 15, wherein the first event corresponds to an error event that occurs during the operation identified in the first diagnostic data.

18. The computer system of claim 17, wherein the instructions, when executed on the one or more processors, further cause the one or more processors to:
receive, from the enterprise computer system via the second communication protocol, a response to the request for the service;
convert the response received from the enterprise computer system using the second communication protocol, wherein the response is converted from the second format of the second communication protocol to the first format of the first communication protocol; and
send the converted response to the mobile computing device.

19. A non-transitory computer-readable memory storing a set of instructions that, when executed by one or more processors, causes the one or more processors to:
  receive diagnostic data related to processing a request for a service provided by an enterprise computer system, wherein the request is processed by a computer system;
  locate first diagnostic data in the diagnostic data, wherein the first diagnostic data corresponds to a first event that occurs during processing of the request;
  identify attribute data for each attribute of a plurality of attributes corresponding to an operation identified in the first diagnostic data, wherein the attribute data identifies an executed function and operation information about the operation;
  generate a plurality of codes, wherein each code of the plurality of codes is generated using the attribute data corresponding to a different attribute of the plurality of attributes;
  determine a first diagnostic identifier for the first event by combining the plurality of generated codes;
  determine a second diagnostic identifier for a second event that occurs during processing of the request, wherein the second diagnostic identifier is determined based on second diagnostic data in the diagnostic data corresponding to the second event; and
  compute a value that indicates a measure of a match between the first diagnostic identifier and the second diagnostic identifier, wherein the value is computed by comparing the first diagnostic identifier to the second diagnostic identifier.

20. The non-transitory computer-readable memory of claim 19, wherein comparing the first diagnostic identifier to the second diagnostic identifier includes comparing each generated code of the plurality of codes combined for determining the first diagnostic identifier to a corresponding generated code in the second diagnostic identifier, wherein each generated code of the plurality of codes combined for determining the first diagnostic identifier corresponds to a distinct attribute of the plurality of attributes, and wherein the measure of the match is computed using a ratio of generated codes that match based on comparing the first diagnostic identifier to the second diagnostic identifier.

* * * * *

UNITED STATES PATENT AND TRADEMARK OFFICE
CERTIFICATE OF CORRECTION

PATENT NO. : 9,529,657 B2  
APPLICATION NO. : 14/490619  
DATED : December 27, 2016  
INVENTOR(S) : Jan et al.

Page 1 of 1

It is certified that error appears in the above-identified patent and that said Letters Patent is hereby corrected as shown below:

In the Specification

In Column 38, Line 30, delete "UNIXO" and insert -- UNIX® --, therefor.

Signed and Sealed this  
Twentieth Day of June, 2017

Joseph Matal  
*Performing the Functions and Duties of the*  
*Under Secretary of Commerce for Intellectual Property and*  
*Director of the United States Patent and Trademark Office*